(12) United States Patent
Nakaoka et al.

(10) Patent No.: US 7,588,298 B2
(45) Date of Patent: Sep. 15, 2009

(54) BRAKE SYSTEM CONTROL APPARATUS

(75) Inventors: Hiroshi Nakaoka, Okazaki (JP);
Yoshito Tanaka, Nishikamo-gun (JP);
Masayasu Ohkubo, Okazaki (JP);
Masaaki Komazawa, Nishkamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/292,615

(22) Filed: Nov. 21, 2008

(65) Prior Publication Data
US 2009/0096284 A1   Apr. 16, 2009

Related U.S. Application Data

(62) Division of application No. 11/251,989, filed on Oct. 18, 2005, now Pat. No. 7,513,578.

(30) Foreign Application Priority Data

Oct. 22, 2004 (JP) ............................. 2004-307660

(51) Int. Cl.
*B60T 8/66* (2006.01)
(52) U.S. Cl. .................. 303/169; 303/159; 303/189
(58) Field of Classification Search .................. 303/11, 303/155, 159, 119.1, 169, 189, 185–190, 303/DIG. 1, DIG. 2
See application file for complete search history.

(56) References Cited

U.S. PATENT DOCUMENTS 5,089,967 A  2/1992  Haseda et al.
5,388,896 A  2/1995  Hartmann et al.
6,491,358 B2  12/2002  Soejima et al.
6,742,851 B1  6/2004  Woywod et al.
2003/0111899 A1  6/2003  Heinemann

FOREIGN PATENT DOCUMENTS

| DE | 42 25 983 C2 | 2/1994 |
| DE | 195 15 057 A1 | 5/1996 |
| DE | 195 45 001 A1 | 6/1997 |
| DE | 197 32 998 A1 | 2/1999 |
| DE | 101 20 529 A1 | 2/2002 |
| DE | 102 07 378 A1 | 5/2003 |
| JP | A-61-56248 | 3/1986 |
| JP | A-9-175367 | 7/1997 |
| JP | A 2004-122974 | 4/2004 |

*Primary Examiner*—Xuan Lan Nguyen
(74) *Attorney, Agent, or Firm*—Oliff & Berridge, PLC

(57) ABSTRACT

A non-consideration creating portion creates a non-consideration control command value based on a target value and an actual value of hydraulic pressure of a brake cylinder in a control-target brake system i. A consideration creating portion creates a consideration control command value based on the target value and the actual value of the hydraulic pressure in the control-target brake system i and a target value and an actual value of hydraulic pressure in a comparison-target brake system j. Then, one of the consideration control command value and the non-consideration command value is selected based on an absolute value of a difference in the target value between the control-target brake system i and the comparison-target brake system j, and a combination of a control mode in the control-target brake system i and a control mode in the comparison-target brake system j.

11 Claims, 9 Drawing Sheets

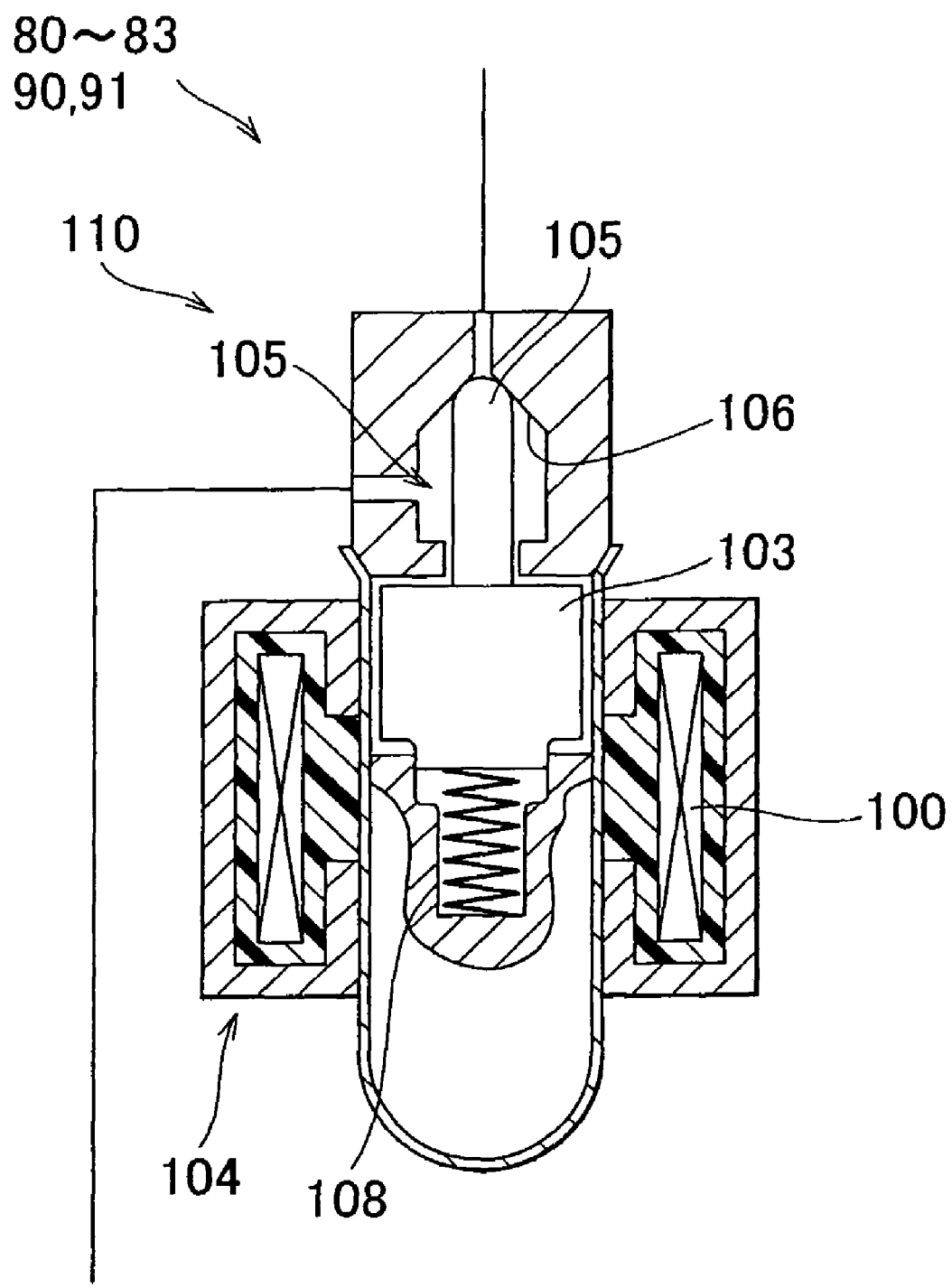

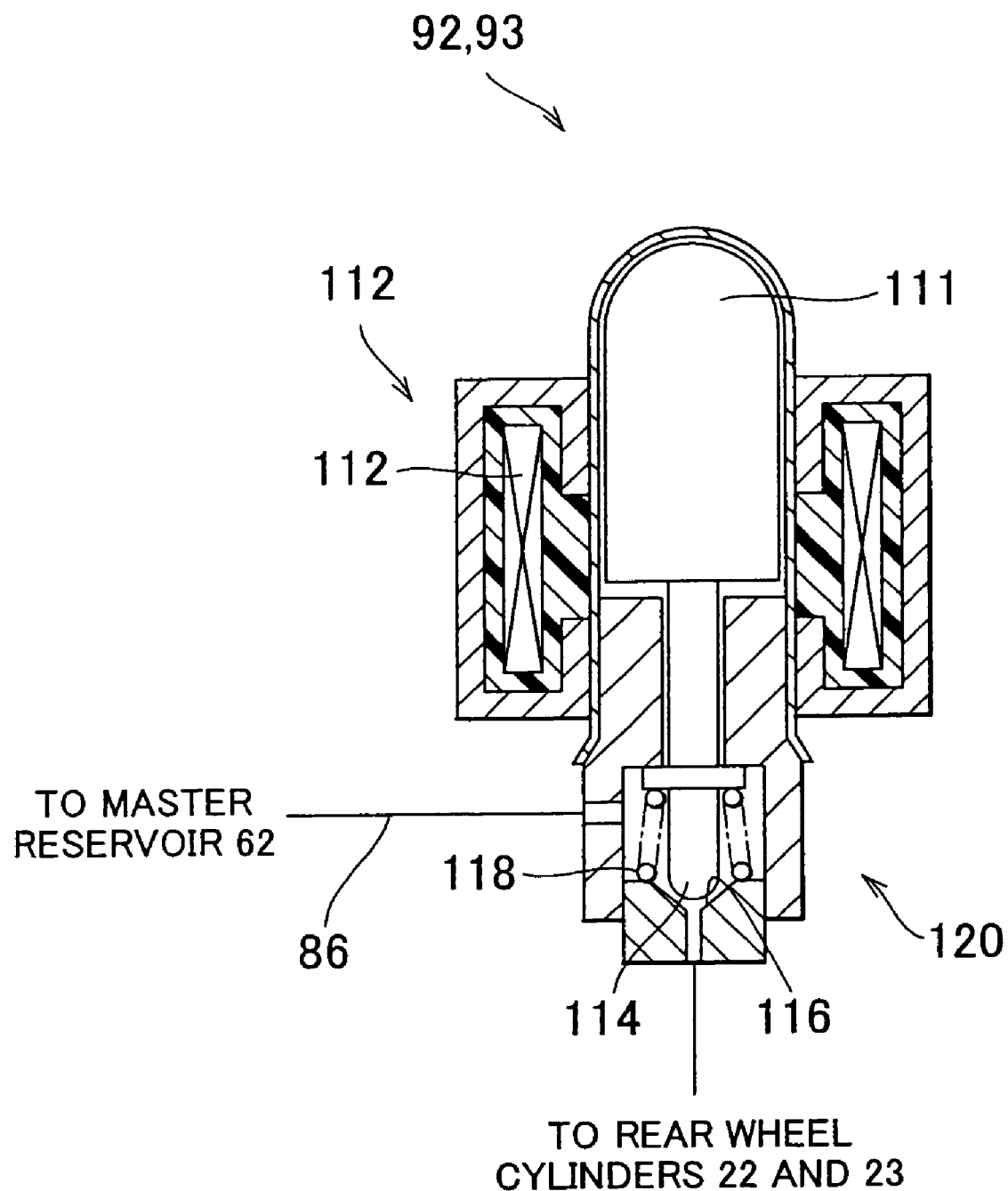

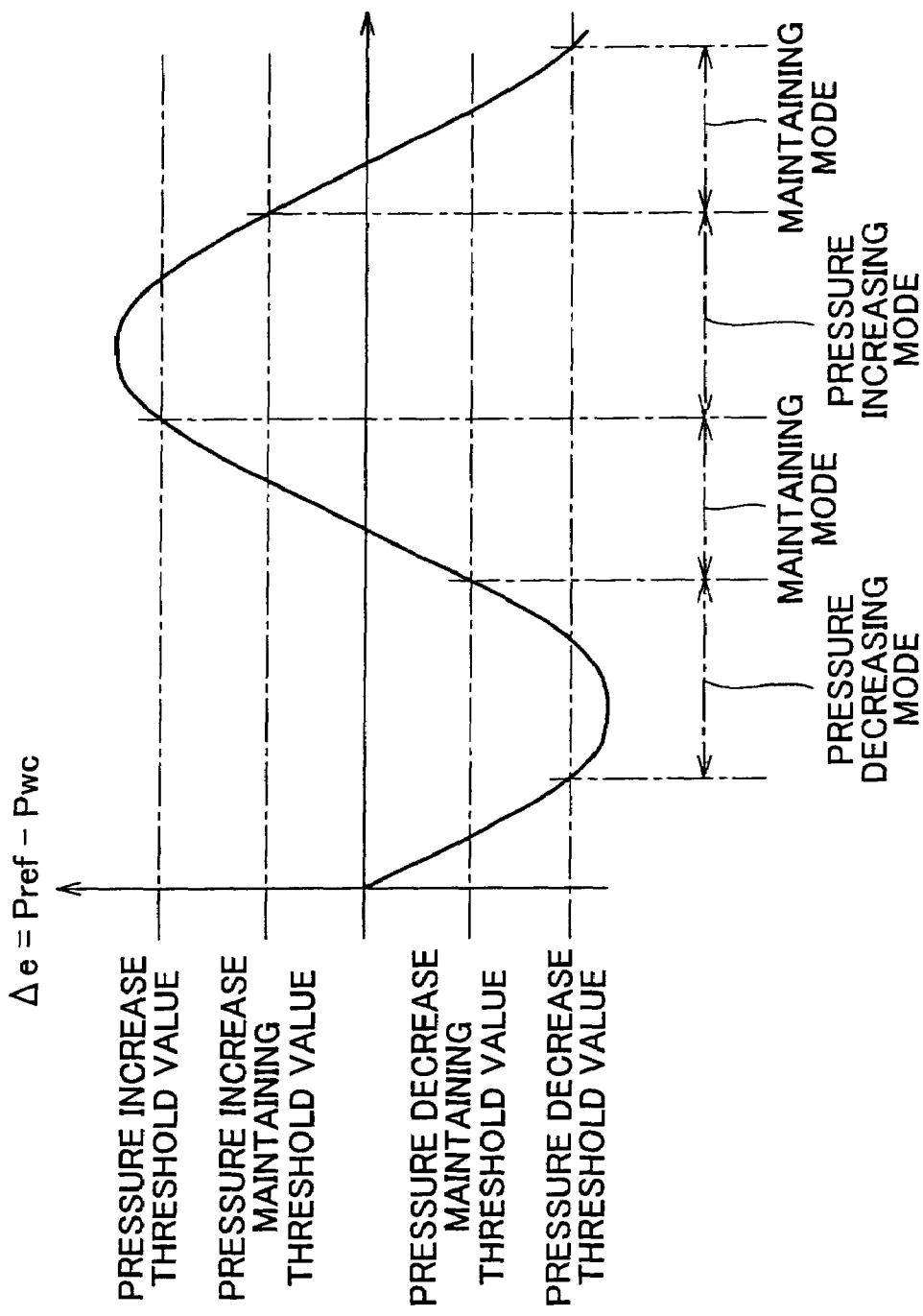

BRAKE SYSTEM CONTROL APPARATUS

INCORPORATION BY REFERENCE

This is a Division of application Ser. No. 11/251,989 filed Oct. 18, 2005, which claims priority to Japanese Patent Application No. 2004-307660 filed on Oct. 22, 2004, the disclosures of which are hereby incorporated herein by reference in their entireties.

BACKGROUND OF THE INVENTION

1. Field of the Invention

The invention relates generally to a brake system control apparatus including plural brake systems, and, more specifically, to control of a control actuator of each of the plural brake systems.

2. Description of the Related Art

Japanese Patent Application Publication No. 2004-122974 A discloses a brake system control apparatus that includes plural brake systems each of which includes a brake and a control actuator that can control braking torque applied to a wheel by the brake. The brake system control apparatus also includes a braking torque control device which creates a control command value for the control actuator of each of the plural brake systems, and which outputs the control command value to the control actuator. The braking torque control device includes (a) a first creating portion that creates a control command value for a control actuator of a brake system targeted for control (hereinafter, referred to as the "control-target brake system"), which is one of the plural brake systems, based a target value of braking torque of a brake of the control-target brake system; (b) a second creating portion that corrects a first control command value, that is, the control command value created by the first creating portion, based on a difference between an actual value of the braking torque applied to the wheel by the brake of the control-target brake system and an actual value of braking torque in another brake system, thereby creating a second control command value; and (c) a control command value selecting portion that selects the second control command value, when the actual value of the braking torque in the control-target brake system is larger than the actual value of the braking torque in the other brake system, and that selects the first control command value, when the actual value of the braking torque in the control-target brake system is equal to or smaller than the actual value of the braking torque in the other brake system.

SUMMARY OF THE INVENTION

It is an object of the invention to make it possible, when at least two control command values are created, to more appropriately select a control command value from among the at least two control command values, thereby reducing, if required, a difference in response between a control-target brake system and each of at least one of the other brake systems.

A brake system control apparatus according to a first aspect of the invention includes plural brake systems each of which includes at least one brake and a control actuator that can control braking torque generated by the at least one brake, the brake system control apparatus including a braking torque control device which creates a control command value for the control actuator of each of the plural brake systems, and which outputs the created control command value to the control actuator. The braking torque control device includes (i) a consideration creating portion which creates a first control command value for the control actuator of a control-target brake system that is one of the plural brake systems based on information concerning an operation of the at least one brake in the control-target brake system, and information concerning an operation of the at least one brake in each of at least one of the other brake systems; (ii) non-consideration creating portion which creates a second control command value for the control actuator of the control-target brake system based on the information concerning the control-target brake system, but not based on the information concerning each of the at least one of the other brake systems; and (iii) a control command value selecting portion which selects one of the first control command value created by the consideration creating portion and the second control command value created by the non-consideration creating portion based on at least one of (a) an absolute value of a difference between a target value of braking torque in the control-target brake system, and a target value of braking torque in each of the at least one of the other brake systems; and (b) a combination of a control mode in the control-target brake system and a control mode in each of the at least one of the other brake systems.

For example, it is not preferable to select the first control command value (consideration control command value) when the absolute value of the difference in the target value of the braking torque between the control-target brake system and each of the at least one of the other brake-systems is large. When the absolute value of the difference in the target value is equal to or larger than a set value, it is considered that a situation concerning the control in the control-target brake system is different from a situation concerning the control in each of the at least one of the other brake systems. Accordingly, it is not preferable to take the information concerning each of the at least one of the other brake systems into consideration.

Also, when the control mode in the control-target brake system is an increasing mode in which the braking torque is increased, and the control mode in each of the at least one of the other brake systems is a decreasing mode in which the braking torque is decreased, the directions in which the control torque is changed in the control are different from each other. Accordingly, it is not preferable to take the information concerning each of the at least one of the other brake systems into consideration.

As in the case of the first aspect, in the case where the control command value is selected based on the absolute value of the difference in the target value between the control-target brake system and each of the at least one of the other brake systems and/or the combination of the control modes, if it is not preferable to take the information concerning each of the at least one of the other brake systems into consideration, the second control command value (non-consideration control command value) is selected. Accordingly, the braking torque can be controlled based on the state of the control-target brake system. On the other hand, when it is preferable to take the information concerning each of the at least one of the other brake systems into consideration, the first control command value is selected. Accordingly, a difference in response between the control-target brake system and each of the at least one of the other brake systems can be reduced. Also, simultaneity of the entire brake system control apparatus can be improved.

(2) The selecting portion may select the first control command value created by the consideration creating portion, when the combination of the control mode in the control-target brake system and the control mode in each of the at least one of the other brake systems is a predetermined combination; and the selecting portion may select the second control command value created by the non-consideration creating portion, when the combination of the control mode in the control-target brake system and the control mode in each of the at least one of the other brake systems is not the predetermined combination.

(3) The selecting portion may select the first control command value created by the consideration creating portion, when the control mode in the control-target brake system and the control mode in each of the at least one of the other brake systems are the same, and each of both the control mode in the control-target brake system and the control mode in each of the at least one of the other brake systems is the increasing mode in which the braking torque is increased or the decreasing mode in which the braking torque is decreased; and the selecting portion may select the second control command value created by the non-consideration creating portion, when one of the control mode in the control-target brake system and the control mode in each of the at least one of the other brake systems is the increasing mode in which the braking torque is increased, and the other of the control mode in the control-target brake system and the control mode in each of the at least one of the other brake systems is the decreasing mode in which the braking torque is decreased.

The first control command value is selected, when the control mode in the control-target brake system and the control mode in each of the at least one of the other brake systems are the same, and each of both of the control modes is the increasing mode or the decreasing mode, namely, when the combination of the control modes is a combination of (increasing mode and increasing mode) or a combination of (decreasing mode and decreasing mode). When the control is performed so that the braking torque in the control-target brake system and the braking torque in each of the at least one of the other brake systems are changed in the same direction, it is considered that the level of response in the control-target brake system and the level of response in each of the at least one of the other brake systems are required to be the same. Accordingly, it is appropriate to select the first control command value.

In contrast to this, the second control command value is selected, when the combination of the control mode in the control-target brake system and the control mode in each of the at least one of the other brake systems is a combination of the increasing mode and the decreasing mode, namely, a combination of (increasing mode and decreasing mode) or a combination of (decreasing mode and increasing mode). In these cases, the directions of the control of the braking torque are different. Accordingly, the levels of response are not always required to be the same. Therefore, it is appropriate to select the second control command value in this case.

The first control command value may be selected, when the control mode in the control-target brake system is one of the increasing mode and the decreasing mode, and the control mode in each of the at least one of the other brake systems is a maintaining mode in which the braking torque is maintained, namely, when the combination of the control modes is a combination of (increasing mode and maintaining mode) or a combination of (decreasing mode and maintaining mode). When the control mode in each of the at least one of the other brake systems is the maintaining mode, a delay in control (hereinafter, referred to as a "control delay") in the control-target brake system may be larger than a control delay in each of the at least one of the other brake systems. Accordingly, it may be preferable to select the first control command value.

(4) The selecting portion may select the second control command value created by the non-consideration creating portion, when the absolute value of the difference in the target value of the braking torque between the control-target brake system and each of the at least one of the other brake systems is equal to or larger than a set value; and the selecting portion may select the first control command value created by the consideration creating portion, when the absolute value of the difference in the target value of the braking torque between the control-target brake system and each of the at least one of the other brake systems is smaller than the set value.

When the target value in the control-target brake system is different from the target value in each of the at least one of the other brake systems by a large amount, the directions in which the braking force change may different from each other. Also, the same level of response may not be required. Accordingly, in these cases, it is preferable not to select the first control command value.

(5) The selecting portion may select the second control command value created by the non-consideration creating portion, if the absolute value of the difference in the target value of the braking torque between the control-target brake system and each of the at least one of the other brake systems is equal to or larger than the set value, even when the combination of the control mode in the control-target brake system and the control mode in each of the at least one of the other brake systems is the predetermined combination.

(6) The selecting portion may select the second control command value created by the non-consideration creating portion, if the combination of the control mode in the control-target brake system and the control mode in each of the at least one of the other brake systems is not the predetermined combination, even when the absolute value of the difference in the target value of the braking torque between the control-target brake system and each of the at least one of the other brake systems is smaller than the set value.

Even when the combination of the control mode in the control-target brake system and the control mode in each of the at least one of the other brake systems is the predetermined combination, if the absolute value of the difference in the target value is equal to or larger than the set value, it is preferable to select the second control command value. For example, even when each of both of the control modes is the increasing mode, or each of both of the control modes is the decreasing mode, if the absolute value of the difference in the target value is equal to or larger than the set value, the same level of response may not be required.

Also, even when the absolute value of the difference in the target value between the control-target brake system and each of the at least one of the other brake systems is smaller than the set value, if the combination of the control modes is the combination of (increasing mode and the decreasing mode), it is preferable to select the second control command value, since the directions in which the braking torque is changed are different from each other.

As described so far, it is preferable to select the first control command value, when the absolute value of the difference in the target value between the control-target brake system and each of the at least one of the other brake systems is smaller than the set value, and the combination of the control modes is the predetermined combination.

(7) The selecting portion may select the second control command value created by the non-consideration creating portion, when an absolute value of a difference between an absolute value of a deviation of an actual value from the target value of the braking torque in the control-target brake system, and an absolute value of a deviation of an actual value from the target value of the braking torque in each of the at least one of the other brake systems is equal to or larger than a set value; and the selecting portion may select the first control command value created by the consideration creating portion, when the absolute value of the difference between the absolute value of the deviation of the actual value from the target value of the braking torque in the control-target brake system, and the absolute value of the deviation of the actual value from the target value of the braking torque in each of the at least one of the other brake systems is smaller than the set value.

When the absolute value ($|L\Delta eij|$) of the difference ($L\Delta eij=|\Delta ei|-|\Delta ej|$) between the absolute value of the deviation ($\Delta ei$) in the control-target brake system "i" and the absolute value of the deviation ($\Delta ej$) in each of the at least one of the other brake systems "j" is equal to or larger than the set value, a difference in a control delay (a difference in response) between the control-target brake system "i" and each of the at least one of the other brake systems "j" is large.

When the difference ($|ei|-|\Delta ej|$) in the absolute value of the deviation is a positive value, the control delay in the control-target brake system "i" is larger than the control delay in each of the at least one of the other brake systems "j". A difference in response (difference in control delay) when the absolute value ($|L\Delta eij|$) of the difference in the absolute value of the deviation is large is larger than the difference in response when the absolute value ($|L\Delta eij|$) is small.

Similarly, when the difference ($|\Delta ei|-|\Delta ej|$) in the absolute value of the deviation is a negative value, the control in the control-target brake system "i" is advanced as compared with the control in each of the at least one of the other brake systems "j", and the difference in response when the absolute value ($|L\Delta eij|$) of the difference is large is larger than the difference in response when the absolute value ($|L\Delta eij|$) of the difference is small.

Accordingly, when the absolute value ($|L\Delta eij|$) of the difference in the absolute value of the deviation is equal to or larger than the set value, it is not preferable to take the information concerning each of the at least one of the other brake systems into consideration. Therefore, it is appropriate to select the second control command value. On the other hand, when the absolute value ($|L\Delta eij|$) of the difference in the absolute value of the deviation is smaller than the set value, it is preferable to take the information concerning each of the at least one of the other brake systems into consideration. Therefore, it is appropriate to select the first control command value.

(8) The braking torque control device may perform feedback control based on the deviation of the actual value from the target value of the braking torque in each of the plural brake systems.

According to this aspect, the control actuator is controlled based on the difference between the target value and the actual value, the actual value is fed back, and the control command value is created such that the actual value comes closer to the target value. The control command value is created based on the target value and the actual value of the braking torque in at least the control-target brake system, regardless of whether the control command value is creased by the consideration creating portion or the non-consideration creating portion.

(9) The consideration creating portion may create the control command value based on the target value and the actual value of the braking torque in the control-target brake system, and the target value and the actual value of the braking torque in each of the at least one of the other brake systems.

The feedback control is performed based on the target value and the actual value in the control-target brake system. Accordingly, it is appropriate to create the first control command value based on the target value and the actual value of the braking torque in the control-target brake system, and the target value and the actual value of the braking torque in each of the at least one of the other brake systems.

In the feed-forward control, when the non-consideration creating portion creates the control command value based on the target value, the consideration creating portion may create the control command value based on the target value in the control-target brake system, the actual value in the control-target brake system, and the actual value in each of the at least one of the other brake systems.

(10) The consideration creating portion may create the first control command value based on the deviation of the actual value from the target value of the braking torque in the control-target brake system, and the deviation of the actual value from the target value of the braking torque in each of the at least one of the other brake systems.

The control mode for the braking torque (whether the control for increasing the braking torque or the control for decreasing the braking torque is performed), and a degree of the control delay (level of response) can be obtained based on whether the deviation is a positive value or a negative value, and the absolute value of the deviation. Accordingly, the control mode of the braking torque in the brake system and the degree of the control delay can be obtained based on the deviation in each of the at least one of the other brake systems. If the control command value is created in consideration of the deviation in each of the at least one of the other brake systems and the deviation in the control-target brake system, the control command value can be created based on the degree of the control delay and the combination of the control modes. Accordingly, the control actuators can be controlled such that the same level of response can be obtained.

(11) The consideration creating portion may correct the second control command value created by the non-consideration creating portion, based on the target value and the actual value in each of the at least one of the other brake systems and the target value and the actual value in the control-target brake system.

(12) The consideration creating portion may create the control command value by correcting the control command value created by the non-consideration creating portion, based on the deviation of the actual value from the target value of the braking torque in the control-target brake system and the deviation of the actual value from the target value of the braking torque in each of the at least one of the other brake systems.

(13) The consideration creating portion may set a correction value based on a difference between the absolute value of the deviation of the actual value from the target value of the braking torque in the control-target brake system, and the absolute value of the deviation of the actual value from the target value of the braking torque in each of the at least one of the other brake systems.

As mentioned above, whether the control delay in the control-target brake system is larger than the control delay in each of the at least one of the other brake systems, the degree of the control delay in each of the control-target brake system and the at least one of the other brake systems, and the like can be obtained based on whether the value $L\Delta eij$ obtained by subtracting the absolute value of the deviation in each of the at least one of the other brake systems "j" from the absolute value of the deviation in the control-target brake system "i" is a positive value or a negative value, and based on the absolute value of the value $L\Delta eij$. Accordingly, it is appropriate to set the correction value based on the difference $L\Delta eij$ in the absolute value of the deviation.

For example, when the difference L∆eij in the absolute value of the deviation is a positive value, the control command value is corrected such that a rate of change in the braking torque becomes high. On the other hand, when the difference L∆eij in the absolute value of the deviation is a negative value, the control command value is corrected such that the rate of change in the braking torque becomes low.

More specifically, in the case where the rate of change in the braking torque when the control command value is large is higher than the rate of change in the braking torque when the control command value is small, when the consideration creating portion creates the first control command value by adding the correction value to the second control command value, if the difference L∆eij in the absolute value of the deviation is a positive value, the correction value is set to a positive value, and the positive correction value when the absolute value |L∆eij| of the difference in the absolute value of the deviation is large can be made larger than the positive correction value when the absolute value |L∆eij| of the difference in the absolute value of the deviation is small. Thus, the control delay in the control-target brake system, which is larger than the control delay in each of the at least one of the other brake systems can be reduced, and the difference in response can be reduced. On the other hand, when the difference L∆eij in the absolute value of the deviation is a negative value, the correction value is set to a negative value, and the negative correction value when the absolute value |L∆eij| of the difference is large can be made smaller than the negative correction value when the absolute value |L∆eij| of the difference is small. Thus, the first control command value can set to a small value, and the degree of advance of the control in the control-target brake system with respect to each of the at least one of the other brake systems can be reduced.

In the case where the consideration creating portion corrects a gain K that is used when the first control command value is created (K=α×K, when the gain is corrected by being multiplied by a gain correction coefficient α. When the gain correction coefficient is "1", the gain is not corrected, namely, when the second control command value is obtained), when the difference L∆eij in the absolute value of the deviation is a positive value, the gain correction coefficient α is set to a value equal to or larger than "1", and the absolute value of the gain correction coefficient when the absolute value |L∆eij| of the difference is large is made larger than the absolute value of the gain correction coefficient when the absolute value |L∆eij| of the difference is small. Also, when the difference L∆eij of the absolute value of the deviation is a negative value, the gain correction coefficient α is set to a value smaller than "1", and the gain correction coefficient α when the absolute value |L∆eij| of the difference is large can be made smaller than the gain correction coefficient α when the absolute value |L∆eij| of the difference is small, in a range where the gain correction coefficient α is larger than "0".

(14) The consideration creating portion may create the first control command value for the control-target brake system based on the information concerning the control-target brake system and the information concerning the brake system whose level of response is required to the same as that of the control-target brake system.

When the brake system control apparatus includes plural brake systems, the information concerning any brake system(s) other than the control-target brake system may be taken into consideration. However, it is preferable that the information concerning the brake system whose level of response is required to be the same as that of the control-target brake system be taken into consideration, among the other brake systems. For example, when the absolute value of the difference in the target value is equal to or smaller than the set value, when the combination of the control modes is the predetermined combination, or the like, it can be considered that the same level of response is required.

Also, the brake system whose level of response is required to be the same as that of the control-target brake system may be decided based on a structure of a vehicle. For example, when the normal braking operation is performed, namely, when the braking torque in each of the brake systems is controlled such that the braking torque required by the driver can be obtained, the brake systems corresponding to right and left wheels on each of the front wheel side and the rear wheel side are the brake systems whose levels of response are required to be the same.

(15) The consideration creating portion may create the first control command value based on the information concerning the control-target brake system and the information concerning the brake system including the brake that suppresses rotation of the wheel which is on an opposite side, in a right-and-left direction, of the wheel whose rotation is suppressed by the control-target brake system.

(16) The brake may be a hydraulic brake that applies hydraulic braking torque to a brake rotational body that can rotate together with the wheel by pressing a friction member to the brake rotational body due to hydraulic pressure of a brake cylinder, thereby suppressing rotation of the wheel, and the control actuator may include at least one electromagnetic control valve that can control the hydraulic pressure of at least one brake cylinder. The braking torque control device may include a hydraulic pressure control device that controls the hydraulic pressure of each of the at least one brake cylinder by creating the control command value corresponding to an electric current supplied to the electromagnetic control valve, and outputting the control command value to the electromagnetic control valve.

In the brake system control apparatus according to the above-mentioned aspect, the electromagnetic control valve serving as the control actuator is controlled, and the control command value indicating the electric current supplied to the electromagnetic control valve is created. One brake is provided with one electromagnetic control valve, or two electromagnetic control valves. The control actuator includes a pressure increasing control valve and a pressure decreasing control valve. In the increasing mode in which the hydraulic pressure of the brake cylinder is increased, the electric current supplied to the pressure increasing control valve is controlled. In the decreasing mode in which the hydraulic pressure of the brake cylinder is decreased, the electric current supplied to the pressure decreasing control valve is controlled. In this case, when the control mode is decided, the electromagnetic control valve targeted for the control is decided.

Also, the electromagnetic control valve may be an electromagnetic open/close valve that is opened/closed by ON/OFF control of the supply electric current, or may be a linear control valve. In the case of the linear control valve, an amount of electric current supplied to the linear control valve is continuously controlled, and the linear control valve permits hydraulic fluid, whose amount corresponds to the amount of supply electric current, to flow therethrough. When the electromagnetic control valve is the electromagnetic open/close valve, the control command value corresponding to the ON/OFF state of the supply electric current, a duty control ratio, and the like is created. When the electromagnetic control valve is the linear control valve, the control command value corresponding to the amount of supply electric current is created.

(17) The electromagnetic control valve may permit the hydraulic fluid to flow therethrough at an opening amount that is decided based on at least the electric current supplied to the electromagnetic control valve, and the consideration creating portion may create the first control command value indicating the supply electric current such that the difference in response between the control-target brake system and each of the at least one of the other brake systems is reduced.

The electromagnetic control valve may be configured such that the opening amount when the supply electric current is large is larger than the opening amount when the supply electric current is small. Alternatively, the electromagnetic control valve may be configured such that the opening amount when the supply electric current is large is smaller than the opening amount when the supply electric current is small. In either of these cases, the amount of hydraulic fluid flowing in/out of the brake cylinder when the opening amount is large can be made larger than the amount of hydraulic fluid flowing in/out of the brake cylinder when the opening amount is small. Thus, the hydraulic pressure of the brake cylinder can be made closer to the target hydraulic pressure promptly.

(18) The electromagnetic control valve may include a seating valve including a valve element, a valve seat, and a spring; and an electromagnetic driving force applying device including a solenoid. The relative position of the valve element with respect to the valve seat is set based on a relationship among electromagnetic driving force applied by the electromagnetic driving force applying device, force applied by the spring, and differential pressure applying force that acts according to a pressure difference between the upstream side and the downstream side of the electromagnetic control valve.

When the spring is provided so as to apply force such that the valve element contacts the valve seat, the electromagnetic control valve is a normally closed valve. When the spring is provided so as to apply force such that the valve element moves away from the valve seat, the electromagnetic control valve is a normally open valve.

(19) A brake system control apparatus according to a second aspect of the invention includes plural brake systems each of which includes at least one brake and a control actuator that can control braking torque generated by the at least one brake, the brake system control apparatus including a braking torque control device which creates a control command value for the control actuator of each of the plural brake systems, and which outputs the created control command value to the control actuator. The braking torque control device includes a consideration creating portion that creates the control command value for the control actuator of a control-target brake system that is one of the plural brake systems, based on an actual value and a target value of braking torque in the control-target brake system and an actual value and a target value of braking torque in each of at least one of the other brake systems.

According to the second aspect, the control command value for the control-target brake system is created based on the target value and the actual value of the braking torque in the control-target brake system, and the target value and the actual value of the braking torque in each of at least one of the other brake systems.

Since the control command value is created based on the target value and the actual value of the braking torque in each of the at least one of the other brake systems (the consideration-target brake system) and the target value and the actual value in the control-target command value, it becomes possible to take not only the deviation in the control-target brake system but also the deviation in the consideration-target brake system into consideration. Accordingly, the level of response in the control-target brake system and the level of response in each of the at least one of the other brake systems can be the same.

Namely, whether the information concerning each of the at least one of the other brake systems is taken into consideration is determined based on the target value and the actual value in each of the at least one of the other brake systems and the target value and the actual value in the control-target brake system, it becomes possible to accurately determine whether the information concerning each of the at least one of the other brake systems should be taken into consideration.

(20) A brake system control apparatus according to a third aspect of the invention includes a consideration creating portion which creates a control command value for a control actuator of a control-target brake system that is one of the plural brake systems based on at least a target value of braking torque in the control-target brake system; an absolute value of a deviation of an actual value from the target value of the braking torque in the control-target brake system; and an absolute value of a deviation of an actual value from a target value of the braking torque in each of at least one of the other brake systems.

(21) In a brake system control apparatus according to a fourth aspect of the invention, the braking torque control device includes a first creating portion which creates a control command value for a control actuator of a control-target brake system that is one of the plural brake systems based on at least a target value of braking torque in the control-target brake system; a second creating portion which creates a second control command value by correcting the first control command value created by the first creating portion based on the value obtained by subtracting an absolute value of a deviation of an actual value from a target value of braking torque in each of at least one of the other brake systems from an absolute value of a deviation of an actual value from the target value of the braking torque in the control-target brake system; and a control command value selecting portion which selects one of the first control command value and the second control command value based on a state of the brake system control apparatus.

(22) A brake system control apparatus according to a fifth aspect of the invention includes a consideration creating portion which creates a first control command value for a control actuator of a control-target brake system that is one of the plural brake systems based on information concerning an operation of the at least one brake in the control-target brake system and information concerning each of at least one of the other brake systems; a non-consideration creating portion which creates a second control command value for the control actuator of the control-target brake system based on the information concerning the control-target brake system, but not based on the information concerning each of the at least one of the other brake systems; and a control command value selecting portion which selects one of the first control command value created by the consideration creating portion and the second control command value created by the non-consideration creating portion based on a target value of braking torque in the control-target brake system and a target value in each of the at least one of the other brake systems.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 2 is a cross sectional view schematically showing a normally closed valve included in an individual hydraulic pressure control valve device provided in the hydraulic brake apparatus;

FIG. 3 is a cross sectional view schematically showing a normally open valve included in the individual hydraulic pressure control valve device;

FIG. 5 is a graph conceptually showing a control threshold value stored in the storing portion of the brake ECU;

DETAILED DESCRIPTION OF THE EXEMPLARY EMBODIMENTS

Hereafter, a brake system control apparatus according to an embodiment of the invention will be described in detail with reference to accompanying drawings.

Figure 1:
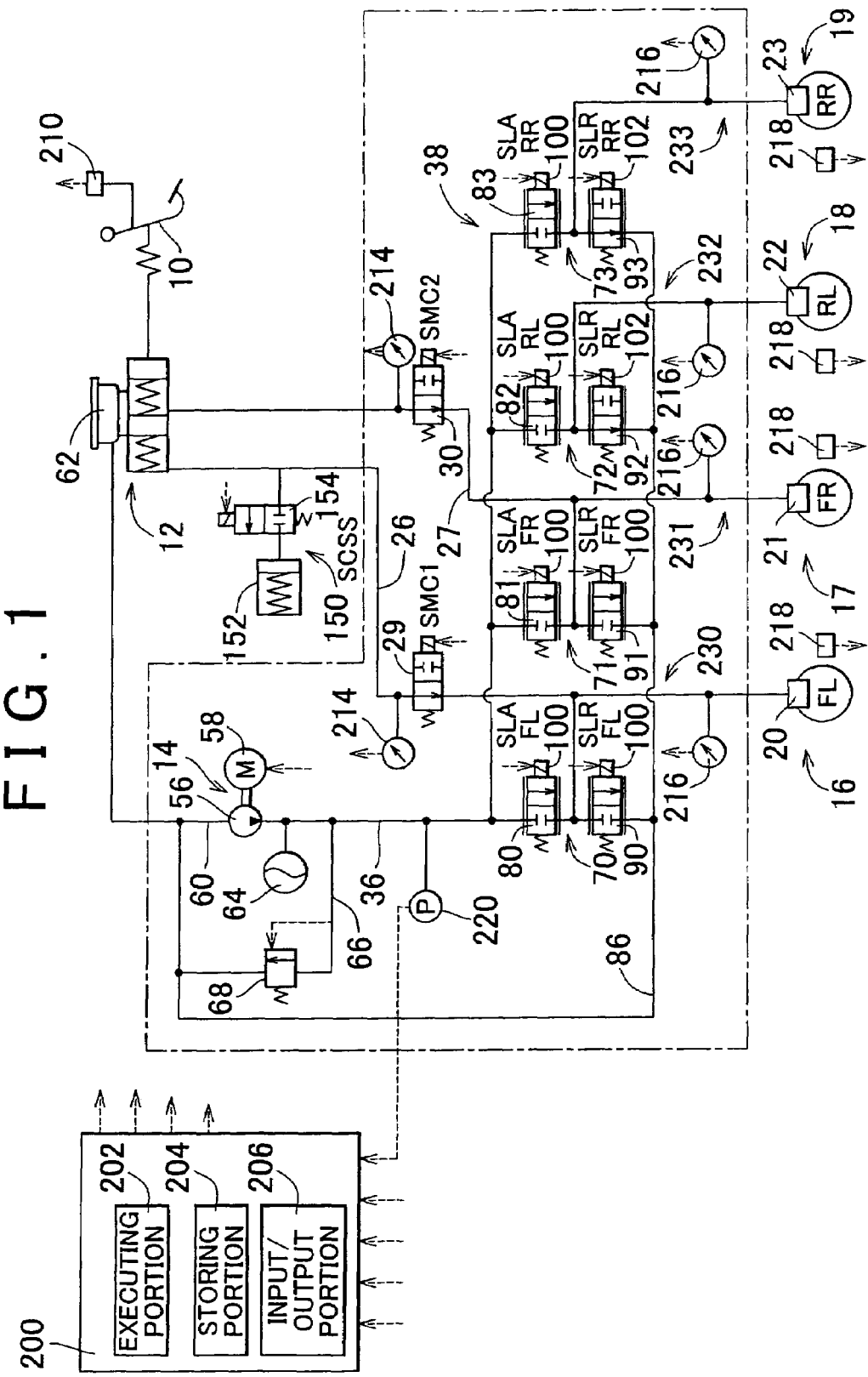
FIG. 1 is a circuit diagram showing a hydraulic brake apparatus that is a brake system control apparatus according to an embodiment of the invention.

A brake system control apparatus shown in FIG. 1 includes a brake pedal 10 serving as a brake operating member; a master cylinder 12 including two compressing chambers; a pump device 14 serving as a hydraulic pressure source; and hydraulic brakes 16, 17, 18, and 19 that are provided for a left front wheel, a right front wheel, a left rear wheel, and a right rear wheel, respectively.

The hydraulic brakes 16, 17, 18, and 19 include brake cylinders 20, 21, 22, and 23, respectively. The hydraulic brakes 16, 17, 18, and 19 are operated by the hydraulic pressures of the brake cylinders 20, 21, 22, and 23, respectively, thereby applying braking torque to the respective wheels.

The master cylinder 12 includes two compressing pistons. When a driver operates the brake pedal 10, hydraulic pressure corresponding to the brake pedal operation force is generated in each of hydraulic chambers positioned ahead of the two respective compressing pistons. The two compressing chambers of the master cylinder 12 are connected to the brake cylinder 20 for the left front wheel and the brake cylinder 21 for the right front wheel through master passages 26 and 27, respectively. Master shut-off valves 29 and 30 are provided in the master passages 26 and 27, respectively. Each of the master shut-off valves 29 and 30 is a normally open electromagnetic open/close valve.

The four brake cylinders 20, 21, 22, and 23 are connected to the pump device 14 through a pump passage 36. While the brake cylinders 20 and 21 are shut off from the master cylinder 12, hydraulic pressure is supplied from the pump device 14 to the brake cylinders 20, 21, 22, and 23, whereby the hydraulic brakes 16, 17, 18, and 19 are operated. The hydraulic pressure of each of the brake cylinders 20, 21, 22, and 23 is controlled by a hydraulic pressure control valve device 38.

The pump device 14 includes a pump motor 58 that drives a pump 56. A master reservoir 62 is connected to an inlet side of the pump 56 through an intake passage 60, and an accumulator 64 is connected to an outlet side of the pump 56. A hydraulic fluid in the reservoir 62 is pumped up by the pump 56, and supplied to the accumulator 64. Then, the hydraulic fluid is stored in the accumulator 64 while being compressed.

The outlet side and the inlet side of the pump 56 are connected by a relief passage 66. A relief valve 68 is provided in the relief passage 66. The relief valve 68 is opened when the hydraulic pressure on the accumulator side, that is, the high pressure side, exceeds a set pressure.

The hydraulic pressure control valve device 38 includes individual hydraulic pressure control valve devices 70, 71, 72, and 73 provided for the brake cylinders 20, 21, 22, and 23, respectively. The individual hydraulic pressure control valve devices 70, 71, 72, and 73 include pressure increasing linear valves 80, 81, 82, and 83, and pressure decreasing linear valves 90, 91, 92, and 93, respectively. The pressure increasing linear valves 80, 81, 82, and 83 are provided in the pump passage 36, and serve as electromagnetic pressure increasing control valves. The pressure decreasing linear valves 90, 91, 92, and 93 are provided in a pressure decreasing passage 86 which connects the brake cylinders 20, 21, 22, and 23 to the reservoir 62, and serve as electromagnetic pressure decreasing control valves. The pressures of the brake cylinders 20, 21, 22 and 23 can be controlled independently of each other by controlling the pressure increasing linear valves 80, 81, 82, and 83 and the pressure decreasing linear valves 90, 91, 92, and 93.

The pressure increasing linear valves 80, 81, 82 and 83 provided for the left front wheel, the right front wheel, the left rear wheel and the right rear wheel, respectively, and the pressure decreasing linear valves 90 and 91 provided for the left front wheel and the right front wheel, respectively, are normally closed valves, namely, these valves are closed when an electric current is not supplied to a coils 100. The pressure decreasing linear valves 92 and 93 corresponding to the left rear wheel and the right rear wheel, respectively, are normally open valves, that is, these valves are open when an electric current is not supplied to a coil 102.

FIG. 2 shows each of the pressure increasing linear valves 80, 81, 82, and 83 and the pressure decreasing linear valves 90 and 91, which are normally closed valves. Each of the pressure increasing linear valves 80, 81, 82, and 83 and the pressure decreasing linear valves 90 and 92 includes a solenoid 104 including a coil 100, a plunger 103 and the like; and a seating valve 110 including a valve element 105, a valve seat 106, a spring 108 which applies force in a direction in which the valve element 105 contacts the valve seat 106, and the like.

Then an electric current is not supplied to the coil 100, the valve element 105 contacts the valve seat 106 due to force Fs of the spring 108, namely, the valve is closed. When an electric current is supplied to the coil 100, electromagnetic driving force Fd corresponding to the supplied electric current is applied to the plunger 103, and acts in a direction in which the valve element 105 moves away from the valve seat 106. Also, differential pressure acting force Fp corresponding to a difference in the pressure between the upstream side and the downstream side of the valve acts in the direction in which the valve element 105 moves away from the valve seat 106. The relative position of the valve element 105 with respect to the valve seat 106 is decided based on a relationship between the electromagnetic driving force Fd and the differential pressure acting force Fp, and the force Fs of the spring. Hydraulic fluid whose amount corresponds to a valve opening amount determined based on the electromagnetic driving force Fd is allowed to flow through the valve.

FIG. 3 shows each of the pressure decreasing linear valves 92 and 93 which are the normally open valves. Each of the pressure decreasing linear valves 92 and 93 includes a solenoid 112 including a coil 102, a plunger 111 and the like; and a seating valve 120 including a valve element 114, a valve seat 116, a spring 118 which applies force such that the valve element 114 moves away from the valve seat 116, and the like. The pressure decreasing linear valve 92 is provided between the brake cylinder 22 and the reservoir 62 in a state where the differential pressure acting force Fp corresponding to a difference in pressure between the brake cylinder 22 and the reservoir 62 is applied to the valve elements 114. Similarly, the pressure decreasing linear valve 93 is provided between the brake cylinder 23 and the reservoir 62 in a state where the differential pressure acting force Fp corresponding to a difference in pressure between the brake cylinder 23 and the reservoir 62 is applied to the valve elements 114. While an electric current is not supplied to the coil 102, the valve element 114 is kept away from the valve seat 116 due to the differential pressure acting force Fp and the force Fs of the spring 118, namely, the valve is open. When an electric current is supplied to the coil 102, the electromagnetic force Fd corresponding to the electric current acts in the direction in which the valve element 114 contacts the valve seat 116. The relative position of the valve element 114 with respect to the valve seat 116 is decided based on a relationship between the force Fs of the spring 118 and the differential pressure acting force Fp, and the electromagnetic driving force Fd.

A stroke simulator device 150 is provided in the master passage 26. The stroke simulator device 150 includes a stroke simulator 152 and a normally closed simulator open/close valve 154. The simulator open/close valve 154 is opened/closed, whereby communication between the stroke simulator 152 and the master cylinder 12 is permitted/interrupted. In the embodiment, the state where the hydraulic brakes 16, 17, 18, and 19 are operated by the hydraulic fluid supplied from the pump device 14 is an open state; and a state where the hydraulic brakes 16, 18, 18, and 19 are operated by the hydraulic fluid supplied from the master cylinder 12 is a closed state.

As shown in FIG. 1, the brake system control apparatus is controlled according to a command transmitted from a brake ECU 200. The brake ECU 200 is formed mainly of a computer, and includes an executing portion 202, a storing portion 204, an input/output portion 206, and the like. The input/output portion 206 is connected to a stroke sensor 210, a master pressure sensor 214, a brake hydraulic pressure sensor 216, a wheel speed sensor 218, a hydraulic pressure source hydraulic sensor 220, and the like. The input/output portion 206 is connected, through a switch circuit (not shown), to the coil 100 of each of the pressure increasing linear valves 80, 81, 82, and 83, the coil 100 of each of the pressure decreasing linear valves 90 and 91, the coil 102 of each of the pressure decreasing linear valves 92 and 93, a coil of each of the master shut-off valves 29 and 30, and a coil of the simulator control valve 154. The input/output portion 206 is also connected to a pump motor 58 through a drive circuit.

Figure 4A:
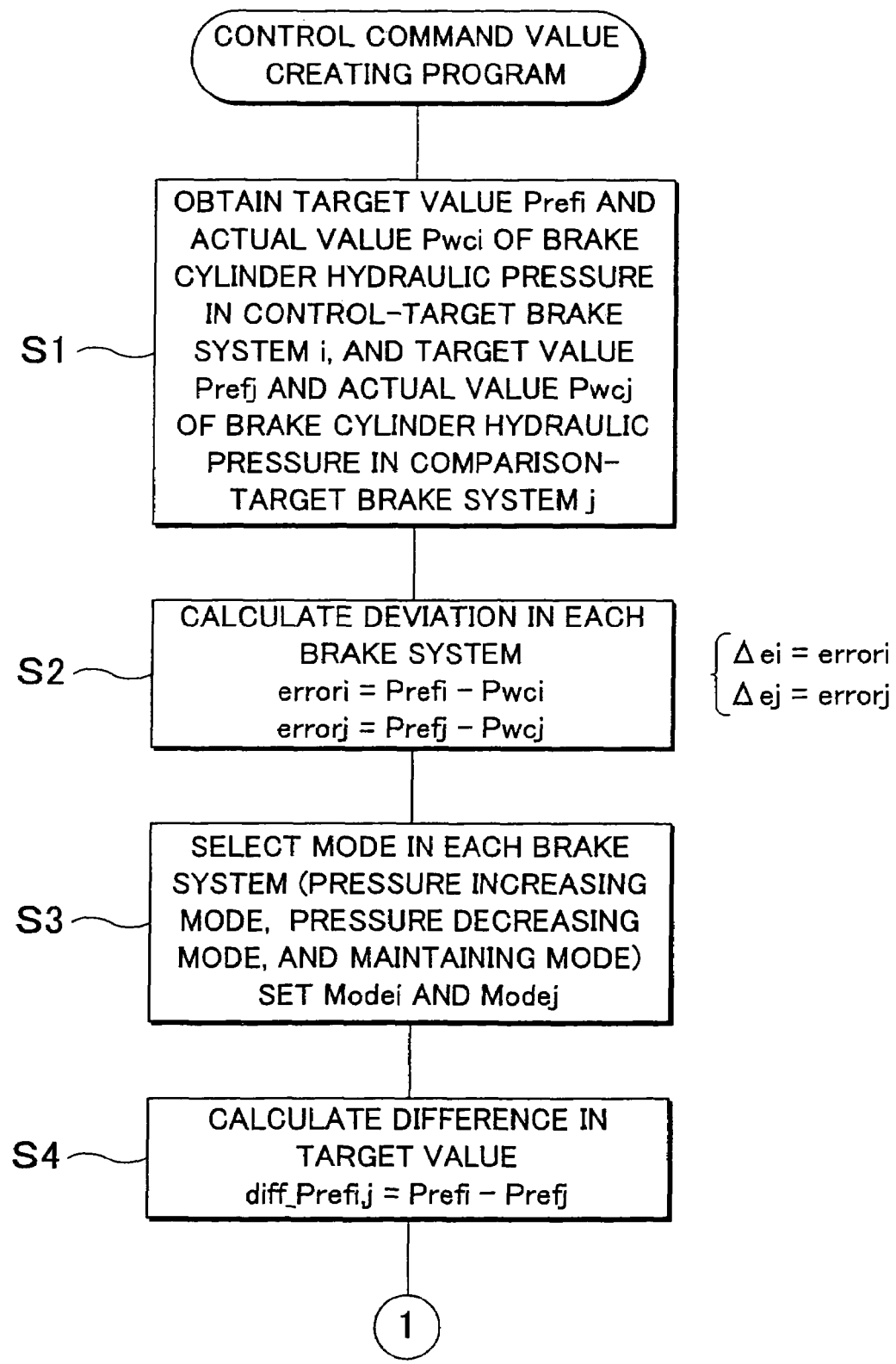
FIGS. 4A and 4B are a flowchart showing a control command value creating program stored in a storing portion of a brake ECU of the hydraulic brake apparatus.
Figure 4B:
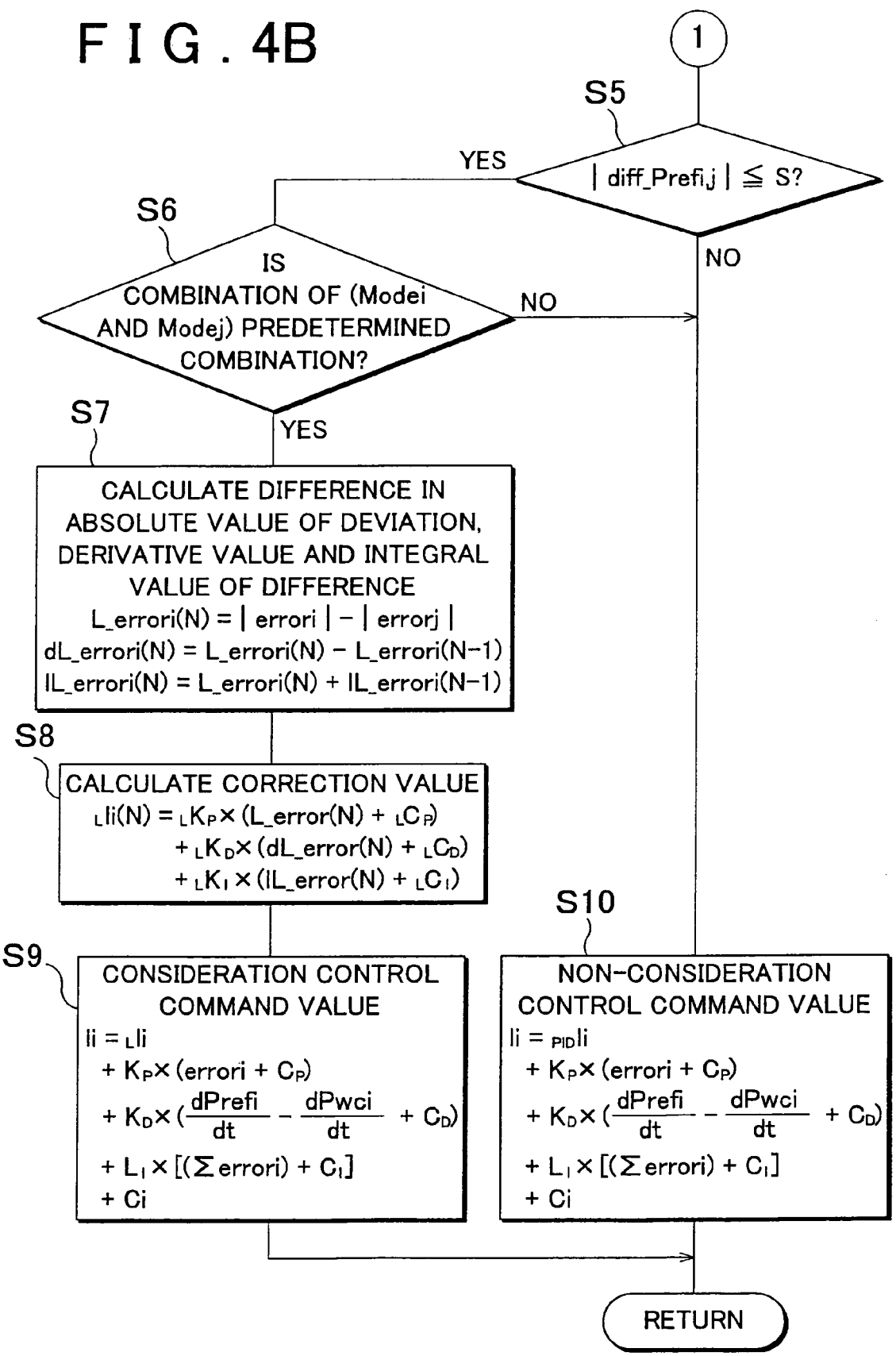

The storing portion 204 stores a control command value creating program, which is shown in a flowchart in FIGS. 4A and 4B, and the like.

In the embodiment, brake systems 230, 231, 232, and 233 are formed mainly of the brake cylinders 20, 21, 22 and 23, and the individual hydraulic pressure control valve devices 70, 71, 72, and 73, respectively. The control actuators are formed of the individual control valve devices 70, 71, 72, and 73, respectively. The control actuators respectively include the pressure increasing control valves 80, 81, 82, and 83, and the pressure decreasing control valves 90, 91, 92, and 93.

These pressure increasing control valves 80, 81, 82, and 83, and the pressure, decreasing control valves 90, 91, 92, and 93 are controlled in a feedback manner. The brake ECU 200 creates a control command values for the brake systems 230, 231, 232, and 233 based on deviations of actual values from target values of the hydraulic pressures of the brake cylinders 20, 21, 22, and 23, and outputs the control command values to the brake systems 230, 231, 232, and 233, respectively. Each of the control command values for the brake systems 230 and 231 indicates an amount of electric current supplied to the 100 such that the actual value comes close to the target value. Each of the control command values for the brake systems 232 and 233 indicates an electric current supplied to the coil 100 and an electric current supplied to the coil 102 such that the actual value comes close to the target value.

The target value of the hydraulic pressure of each of the brake cylinders 20, 21, 22, and 23 is decided based on the operating state of the brake pedal 10 achieved by the driver, when the braking operation is performed normally. The required braking force is calculated based on at least one of an operation stroke and operation force (corresponding to master pressure) of the brake pedal 10, and the target value of the hydraulic pressure of each of the brake cylinder 20, 21, 22, and 23 of the respective wheels is decided such that the required braking force can be obtained. In the embodiment, the target value of the hydraulic pressure braking torque corresponds to the target value of the hydraulic pressure of the brake cylinder. The target values of the hydraulic pressures of the brake cylinders 20, 21, 22, and 23 of the respective wheels may be equal to each other. Alternatively, the target value of the hydraulic pressure of the brake cylinder 20 of the left front wheel and the target value of the hydraulic pressure of the brake cylinder 21 of the right front wheel may be equal to each other, and the target value of the hydraulic pressure of the brake cylinder 22 of the left rear wheel and the target value of the hydraulic pressure of the brake cylinder 23 of the right rear wheel may be equal to each other, and the target value for each of the right and left front wheels and the target value for each of the right and left rear wheels may be set to values along a front and rear braking force distribution line.

In anti-lock control and vehicle stability control, the target values of the hydraulic pressures of the brake cylinders 20, 21, 22, and 23 of the respective wheels are individually decided such that states of a braking slip and a lateral slip become appropriate for a friction coefficient of a road surface.

In the embodiment, information indicating a supply electric current as a control command value is created and output for each of the four brake systems 230, 231, 232, and 233. In some cases, the control command value is created based on the target value and the actual value of the hydraulic pressure of the brake cylinder in the control-target brake system. In the other cases, the control command value is created based on the target value and the actual value of the hydraulic pressure of the brake cylinder in the control-target brake system, and the target value and the actual value of the hydraulic pressure of the brake cylinder in another brake system. The control command value created based on the target value and the actual value in the control-target brake system will be referred to as a non-consideration control command value (hereinafter, referred to as a second control command value), and the control command value created based on the target value and the actual value in the control-target brake system and the target value and the actual value in the other brake system will be referred to as a consideration control command value (hereinafter, referred to as a first control command value).

Then an absolute value of a difference between the target value in the control-target brake system and the target value in the other brake system is equal to or smaller than a set value, and a control mode in the control-target brake system and a control mode in the other brake system are the same and each of both of these control modes is the pressure increasing mode or the pressure decreasing mode, namely, a combination (MODEi, MODEj) of the control modes in the two brake systems is a combination of (pressure increasing mode and pressure increasing mode) or a combination of (pressure decreasing mode and pressure decreasing mode), the first control command value is created. On the other hand, when the absolute value of the difference between the target value in the control-target brake system and the target value in the other brake system is larger than the set value, when the control modes in these brake systems do not match each other, or when each of both of the control modes is the maintaining mode, namely, the combination of the control modes (MODEi, MODEj) is a combination of (pressure increasing mode and pressure decreasing mode), a combination of (pressure increasing mode and pressure decreasing mode), a combination of (pressure increasing mode and maintaining mode), a combination of (pressure decreasing mode and maintaining mode), or a combination of (maintaining mode and maintaining mode), the second control command value is created.

As shown in FIG. 5, when the deviation of the actual value from the target value ($\Delta e$=Pref−Pwc) becomes smaller than a pressure decrease threshold value, the control mode is set to the pressure decreasing mode. The control mode is maintained at the pressure decreasing mode until the deviation exceeds a pressure decrease maintaining threshold value. When the deviation exceeds the pressure decrease maintaining threshold value, the control modes is set to the maintaining mode. When the deviation exceeds a pressure increase threshold value, the control mode is changed from the maintaining mode to the pressure increasing mode. When the deviation becomes smaller than a pressure increase maintaining threshold value, the control mode is changed from the pressure increasing mode to the maintaining mode. Each of the pressure decrease threshold value, the pressure decrease maintaining threshold value, the pressure increase maintaining threshold value, and the pressure increase threshold value is set in advance, and stored in the storing portion 204.

The control-target brake system is one of the plural brake systems 230, 231, 232, and 233. When the control-target brake system is the brake system 230 for the left front wheel, the other brake system is the brake system 231 for the right front wheel. When the control-target brake system is the brake system 232 for the left rear wheel, the other brake system is the brake system 233 for the right rear wheel. When the control-target brake system is the brake system for one of the right and left front wheels, the brake system for the other of the right and left front wheels is the other brake system. When the control-target brake system is the brake system for one of the right and left rear wheels, the brake system for the other of the right and left rear wheels is the other brake system. In each of the front wheel side and the rear wheel side, the same level of response is required in the brake systems for the right and left wheels.

Hereafter, a description will be made concerning the case where one of the brake system 230 for the left front wheel and the brake system 231 for right front wheel is the control-target brake system, and the other of the brake systems 230 and 231 is the other brake system. In the case where the control command value indicating the supply electric current is large, each of the pressure increasing control valves 80 and 81, and the pressure decreasing control valves 90 and 91 included in the individual hydraulic pressure control valve devices 70 and 71 corresponding to the brake cylinder 20 for the left front wheel 20 and the brake cylinder 21 for the right front wheel, respectively, permits a large amount of hydraulic fluid to flow therethrough, as compared with the case where the control command value is small. Hereafter, the other brake system will be referred to as a comparison-target brake system. When the first control command value is created in consideration of the information concerning the comparison-target brake system, the comparison-target brake system is a consideration-target brake system.

A second control command value PIDIi is created based on a deviation $\Delta e_i$ in a control-target brake system i, a derivative value of the deviation (dPrefi/dt−dPwci/dt), and an integral value $\Sigma e_i$ of the deviation, according to an equation, PIDIi=KP ($\Delta e_i$+CP)+KD (dPrefi/dt−dPwci/dt+CD)+KI ($\Sigma \Delta e_i$+CI)+Ci. Here, each of KP, KI, and KD is a gain, and each of CP, CD, CI, and Ci is a constant. Since the second control command value is formed of a proportional term, a derivative term and an integral term, the second control command value can be referred to as a PID command value.

The first control command value is obtained by adding a correction value LIi to the second control command value PIDIi. The correction value LIi is created based on a difference $L\Delta e_i$ between an absolute value $|\Delta e_i|$ of the deviation in the control-target brake system i and an absolute value $|\Delta e_j|$ of the deviation in the comparison-target brake system j, $L\Delta e_i(n)$ (=$|\Delta e_i(n)|-|\Delta e_j(n-1)|$); a derivative value $dL\Delta e_i$ of the difference, $dL\Delta e_i(n)$(=$L\Delta e_i(n)-L\Delta e_i(n-1)$); and an integral value $|L\Delta e_i$ of the difference, $|L\Delta e_i(n)$(=$L\Delta e_i(n)+|L\Delta e_i (n-1)$), according to an equation LIi=LKP ($L\Delta e_i$+LCP)+LKD (dL$\Delta e_i$+LCD)+LKI ($|L\Delta e_i$+LCI). Each of LKP, LKD, and LKI is a gain, and each of LCP, LCD, and LCI is a constant.

A first control command value Ii is obtained according to an equation, Ii=PIDIi+LIi. In the flowchart in FIGS. 4A and 4B, a deviation $\Delta e$ is indicated as "error", $L\Delta e$ is indicated as "L_error", and a difference in the target value is indicated as "diff_Prefi,j".

When the difference $L\Delta e_i(n)$ in the absolute value of the deviation is a positive value, and the absolute value $|\Delta e_i(n)|$ of the deviation in the control-target brake system i is larger than the absolute value $|\Delta e_j(n)|$ of the deviation in the comparison-target brake system j, a control delay in the control-target brake system i is larger than a control delay in the comparison-target brake system j, regardless of whether the pressure increasing control is being performed or the pressure decreasing control is being performed.

A difference in control delay (the difference in response) when the absolute value $|L\Delta e_i(n)|$ is large is larger than the difference in control delay when the absolute value $|L\Delta e_i(n)|$ is small.

Accordingly, when the difference $L\Delta e_i(n)$ in the absolute value of the deviation is a positive value, the correction value LIi is a positive value. The absolute value of the correction value LIi when the absolute value $|L\Delta e_i(n)|$ is large is larger than the absolute value of the correction value LIi when the absolute value $|L\Delta e_i(n)|$ is small. As a result, the control command value for the control-target brake system i is set to a larger value (the first control command value is made larger than the second control command value), and an electric current supplied to each of the pressure increasing linear valves 80 and 81 and the pressure decreasing linear valves 90 and 91 is increased. The opening amount of each of the pressure increasing linear valves 80 and 81 and the pressure decreasing linear valves 90 and 91 is increased, and a larger amount of hydraulic fluid is permitted to flow therethough. Regardless of whether the hydraulic pressure of the brake cylinder is increased or decreased, the rate of change in the hydraulic pressure of the brake cylinder can be made higher, and the target value can be reached more promptly.

On the other hand, when the difference $L\Delta ei(n)$ in the absolute value of the deviation is a negative value, the control in the control-target brake system i is more advanced than the control in the comparison-target brake system j, regardless of whether the pressure increasing control is being performed or the pressure decreasing control is being performed. The difference in response when the absolute value $|L\Delta ei(n)|$ of the difference in the absolute value of the deviation is large is larger than the difference in response when the absolute value $|L\Delta ei(n)|$ is small. Accordingly, when the difference $L\Delta ei(n)$ in the absolute value of the deviation is a negative value, the correction value LIi is a negative value. The absolute value of the correction value LIi when the absolute value $|L\Delta ei(n)|$ is large is larger than the absolute value of the correction value LIi when the absolute value $|L\Delta ei(n)|$ is small. As a result, the control command value for the control-target brake system i is set to a smaller value, and an electric current supplied to each of the pressure increasing linear valves 80 and 81 and the pressure decreasing linear valves 90 and 91 is decreased. The opening amount of each of the pressure increasing linear valves 80 and 81 and the pressure decreasing linear valves 90 and 91 is decreased, and the amount of fluid flowing therethrough is limited. The limited amount of hydraulic fluid is permitted to flow through each of the pressure increasing linear valves 80 and 81 and the pressure decreasing linear valves 90 and 91. The rate of change in the hydraulic pressure of the brake cylinder is suppressed, and the difference in response between the control-target brake system i and the comparison-target brake system j can be reduced. In this case, in the comparison-target brake system j, the rate of change in the hydraulic pressure of the brake cylinder is increased by increasing the supply electric current.

The control command value creating program shown in the flowchart in FIGS. 4A and 4B is performed at predetermined time intervals.

In step S1, the target value and the actual value of the hydraulic pressure of the brake cylinder in the control-target brake system i, and the target value and the actual value of the hydraulic pressure of the brake cylinder in the comparison-target brake system j are obtained. In step S2, the deviation $\Delta ei$ of the actual value from the target value in the control-target brake system i, and the deviation $\Delta ej$ of the actual value from the target value in the comparison-target brake system j are obtained. In step S3, the control mode in the control-target brake system i and the control mode in the comparison-target brake system j are set based on the deviation $\Delta ei$ and the deviation $\Delta ej$, respectively. In step S4, the difference in the target value Pref between the control-target brake system i and the comparison-target brake system j (Prefi−Prefj) is obtained. In step S5, whether the absolute value of the difference is equal to or smaller than a set value S is determined. In step S6, it is determined whether the combination (MODEi, MODEj) of the control mode in the control-target brake system i and the control mode in the comparison-target brake system j is a predetermined combination. In other words, it is determined whether the combination of the control mode in the control-target brake system i and the control mode in the other brake system j (MODEi, MODEj) is the combination of (pressure increasing mode and pressure increasing mode) or the combination of (pressure decreasing mode and pressure decreasing mode).

When the absolute value of the difference in the target value (|Prefi−Prefj|) is equal to or smaller than the set value S, and the combination of the control modes is the predetermined combination, the first control command value is created in step S7 to step S9. The difference $L\Delta ei(n)$ of the deviation is obtained by subtracting the absolute value of the deviation in the comparison-target brake system j from the absolute value of the deviation in the control-target brake system i. Also, the derivative value $dL\Delta ei(n)$ and the integral value $|L\Delta ei(n)|$ of the difference in the absolute value of the deviation are obtained. The control correction value LIi is obtained based on the difference $L\Delta ei(n)$, the derivative value $dL\Delta ei(n)$, and the integral value $|L\Delta ei(n)|$. The first control command value Ii is set to the sum of the second control command value PIDIi (PID control command value) and the correction value LIi.

On the other hand, when the absolute value (|Prefi−Prefj|) of the difference in the target value between the control-target brake system i and the comparison-target brake system j is larger than the set value S, or when the absolute value (|Prefi−Prefj|) of the difference in the target value is equal to or smaller than the set value S and the combination of the control modes is not the predetermined combination, the second control command value (PID control command value) is created in step S10.

The thus created control command value is output, the pressure increasing linear valves 80 and 81 and the pressure decreasing linear valves 90 and 91 are controlled based on the control command value, whereby the hydraulic pressure of the brake cylinder is controlled.

For example, when the braking operation is performed normally, the absolute value of the difference in the target value of the hydraulic pressure between the brake cylinder for the right wheel and the brake cylinder for the left wheel is usually small. Accordingly, the first control command value is selected for each of the brake systems 230 and 231 in many cases. In the case where the control mode is set to the pressure increasing mode in each of both the brake system i and the brake system j, or in the case where the control mode is set to the pressure decreasing mode in each of both the brake system i and the brake system j, if the control delay in the control-target brake system i is larger than the control delay in the comparison-target brake system j, the control command value is increased. A large amount of hydraulic fluid is permitted to flow through each of the pressure increasing linear valves 80 and 81 and the pressure decreasing linear valves 90 and 91, and the rate of change in the hydraulic pressure of the brake cylinder can be increased. Also, when the control in the control-target brake system i is more advanced than the control in the comparison-target brake system j, the control command value is decreased. Accordingly, the amount of hydraulic fluid flowing through each of the pressure increasing linear valves 80 and 81 and the pressure decreasing linear valves 90 and 91 is further limited. Therefore, the rate of change in the hydraulic pressure of the brake cylinder can be reduced. Thus, the hydraulic pressures of the brake cylinders for the right and left front wheels can be changed at the same level of response, and running stability of the vehicle can be improved.

In the case where the control-target brake system is the brake system 230 for the left front wheel, when the first control command value is selected in the brake system 230 for the left front wheel and the first control command value is made larger, the second control command value in the control-target brake system 231 for the right front wheel is made smaller. In this case, the control command value is increased in one of the brake system 230 for the left front wheel and the brake system 231 for the right front wheel, and the control command value is decreased in the other of the brake system 230 and the brake system 231. Then, the gains LKP, LKD, and LKI, and the constants CP, LCD, and LCI, and the like which are used to create the correction value LIi are set such that the levels of response in the brake systems 230 and 231 becomes substantially the same.

Also, while the vehicle stability control is performed during the braking operation, the target values of the hydraulic pressures of the brake cylinders for the right and left wheels are not always the same. Also, the control mode in the brake system 230 and the control mode in the brake system 231 are not always the same. In each of the brake systems 230 and 231, the second control command value is usually selected, and the hydraulic pressures of the brake cylinders for the respective wheels are controlled independently of each other such that the braking slip becomes appropriate. The state similar to that described so far is realized during the anti-lock control as well.

As described so far, in the embodiment, it is possible to appropriately select the control command value from among the first control command value and the second control command value, based on whether the absolute value of the difference in the target value of the hydraulic pressure of the brake cylinder between the control-target brake system and the comparison-target brake system j is equal to or smaller than the set value, and based on whether the combination of the control modes is the predetermined combination. The first control command value can be created, when the levels of response actually need to be the same. Also, the second control command value is selected, when it is preferable not to take the information concerning the comparison-target brake system j into consideration. Accordingly, the hydraulic pressure of the brake cylinder can be controlled based on the information concerning the control-target the brake system i.

Figure 6:
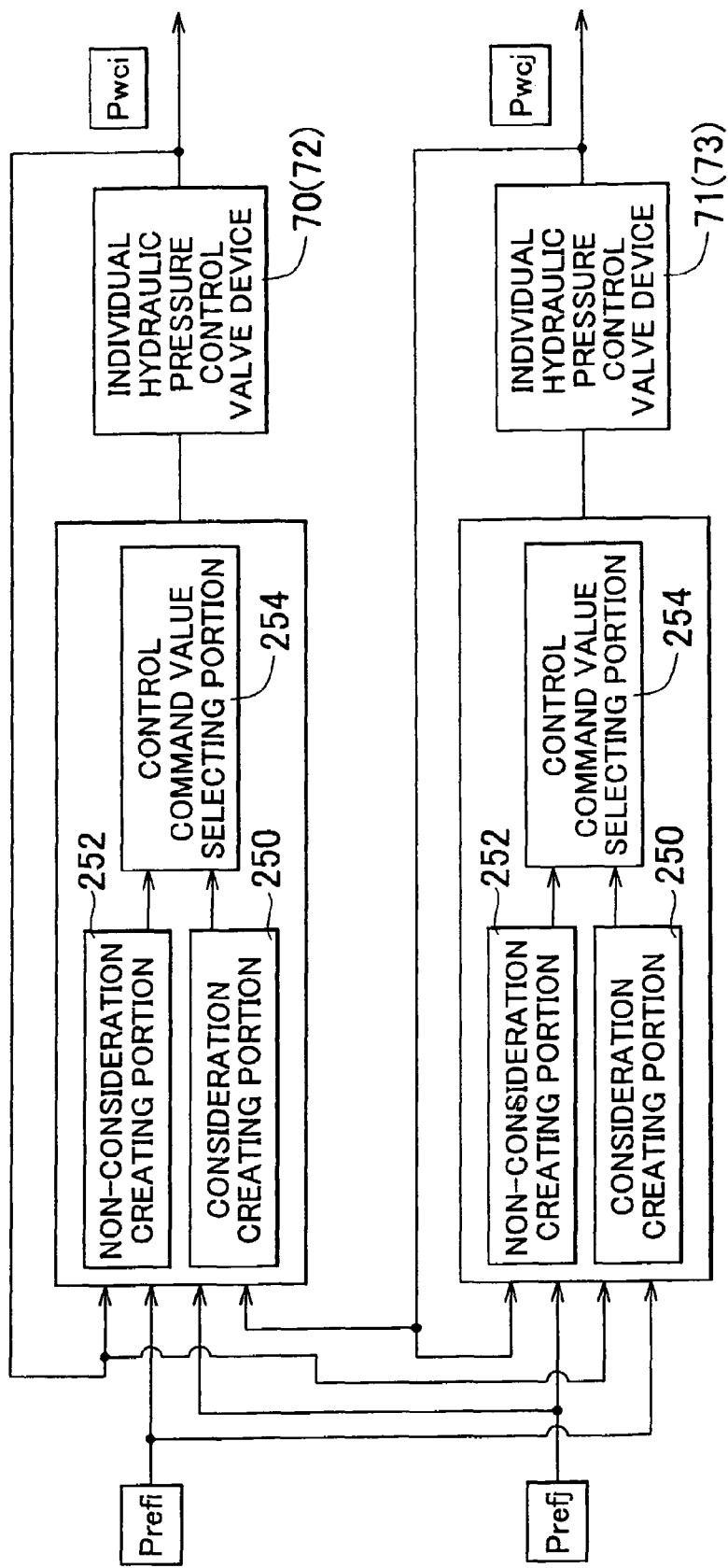
FIG. 6 is a block diagram showing a structure of the brake ECU.

FIG. 6 is a block diagram showing the embodiment. In each of the brake system i for the left front wheel and the brake system j for the right front wheel, a consideration creating portion 250 is formed of a portion of the brake ECU 200, which stores steps S7 to S9 of the control command value creating program shown in the flowchart in FIGS. 4A and 4B, a portion of the brake ECU 200, which performs steps S7 to 9, and the like; and a non-consideration creating portion 252 is formed of a portion of the brake ECU 200, which stores step S10 shown in FIGS. 4A and 4B, a portion of the brake ECU 200, which performs step S10, and the like. Also, a control command value selecting portion 254 is formed of a portion of the brake ECU 250, which stores steps S5 and S6, a portion of the brake ECU 250, which performs steps S5 and S6, and the like.

Also, the brake ECU 200 and the like are the hydraulic brake apparatuses serving as the braking torque control devices.

In the above-mentioned embodiment, two control command value creating portions are selected. However, two control command values may be created, and then one of the two control command value may be selected. In either of these cases, one of the two created control command values is selected as the control command value to be output.

In the above-mentioned embodiment, when each of both the control mode in the control-target brake system i and the control mode in the comparison-target brake system j is the pressure increasing mode or when each of both the control mode in the control-target brake system i and the control mode in the comparison-target brake system j is the pressure decreasing mode, the first control command value is selected. However, even when the control mode in the control-target brake system i is the pressure increasing mode or the pressure decreasing mode, and the control mode in the comparison-target brake system j is the maintaining mode, the first control command value may be created.

Figure 7:
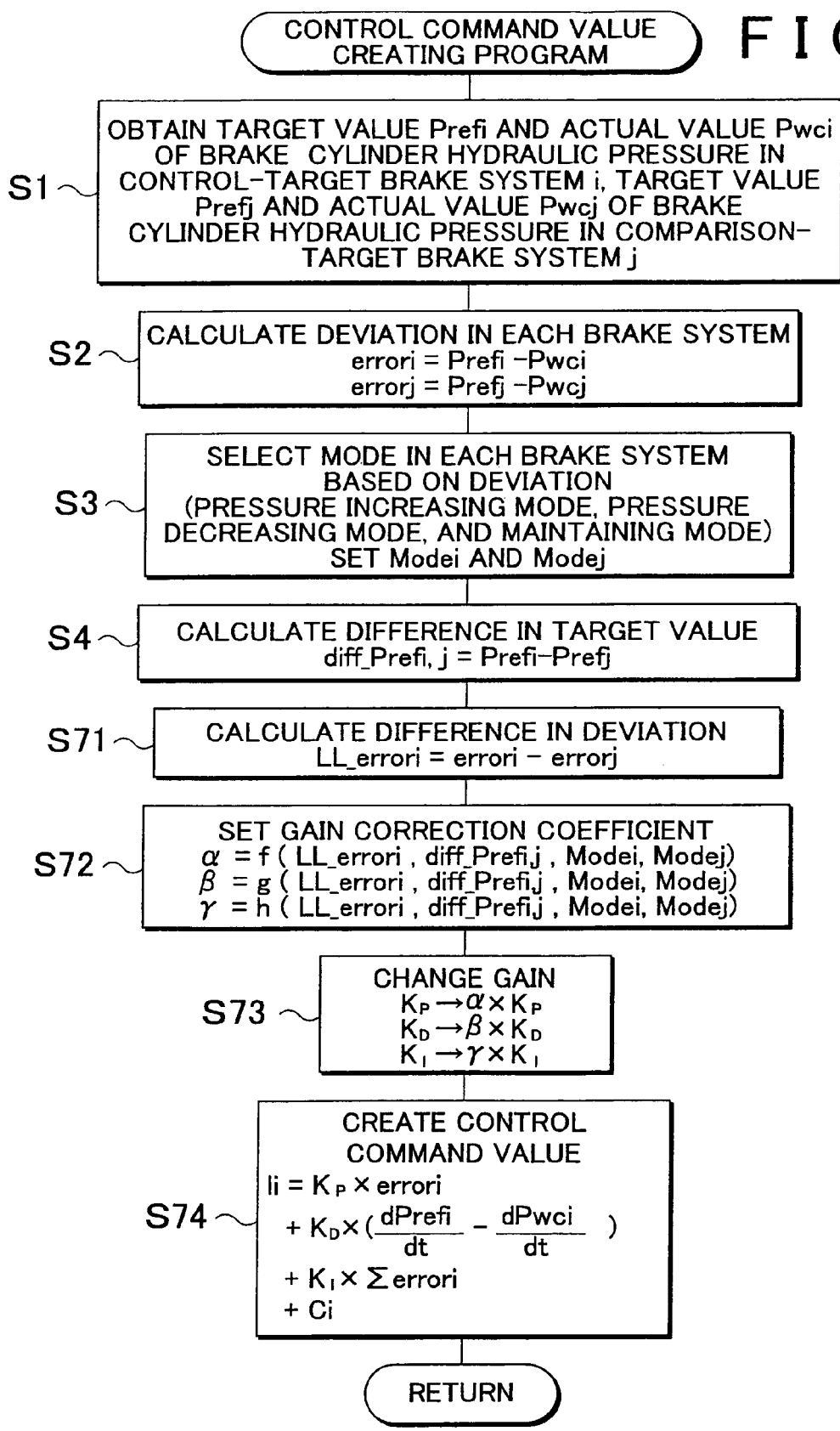
FIG. 7 is a flowchart showing another control command value creating program stored in the storing portion of the brake ECU.

Also, the control command value may be created according to a control command value creating program shown in a flowchart in FIG. 7.

In the embodiment, the control gains KP, KD, and KI are set based on a difference LLΔei in the deviation between the control-target brake system i and the comparison-target brake system j, the absolute value |Prefi−Prefj| of the difference in the target value Pref, and the combination of the control modes (MODEi, MODEj). A difference LLΔe in the deviation is indicated as LL_error in FIG. 7.

As described above, in the embodiment, gain correction values α, β, and γ are based on the difference LLΔei(=Δei−Δej) between the deviation Δei and the deviation Δej, not based on the difference between the absolute value |Δei| of the deviation in the control-target brake system i and the absolute value |Δej| of the deviation in the comparison-target brake system j. In the embodiment, the deviation Δe becomes a positive value when the pressure increasing mode is set, and the deviation Δe becomes a negative value when the pressure decreasing mode is set. Accordingly, the gain correction values α, β, and γ that are used in the case where the pressure increasing mode is set, and the gain correction values α, β, and γ that are used in the case where the pressure decreasing mode is set are obtained independently of each other.

As in the above-mentioned embodiment, the gain correction values that are used in the case where the pressure increasing mode is set, and the gain correction values that are used in the case where the pressure decreasing mode is set may be obtained independently of each other, based on the difference LΔei in the absolute value of the deviation.

When the control gains KP, KD, and KI are αKP, βKD, and γKI, respectively (KP=αKP, KD=βKD, and KI=γKI), the proportional item gain correction value α, the derivative item gain correction value β, and the integral item gain correction value γ are set according to a gain correction value setting routine and according to the following respective equations, α=f (Δei−Δej, Prefi−Prefj, MODEi, MODEj), β=g(Δei−Δej, Prefi−Prefj, MODEi, MODE), and γ=h(Δei−Δej, Prefi−Prefj, MODEi, MODE).

Figure 8:
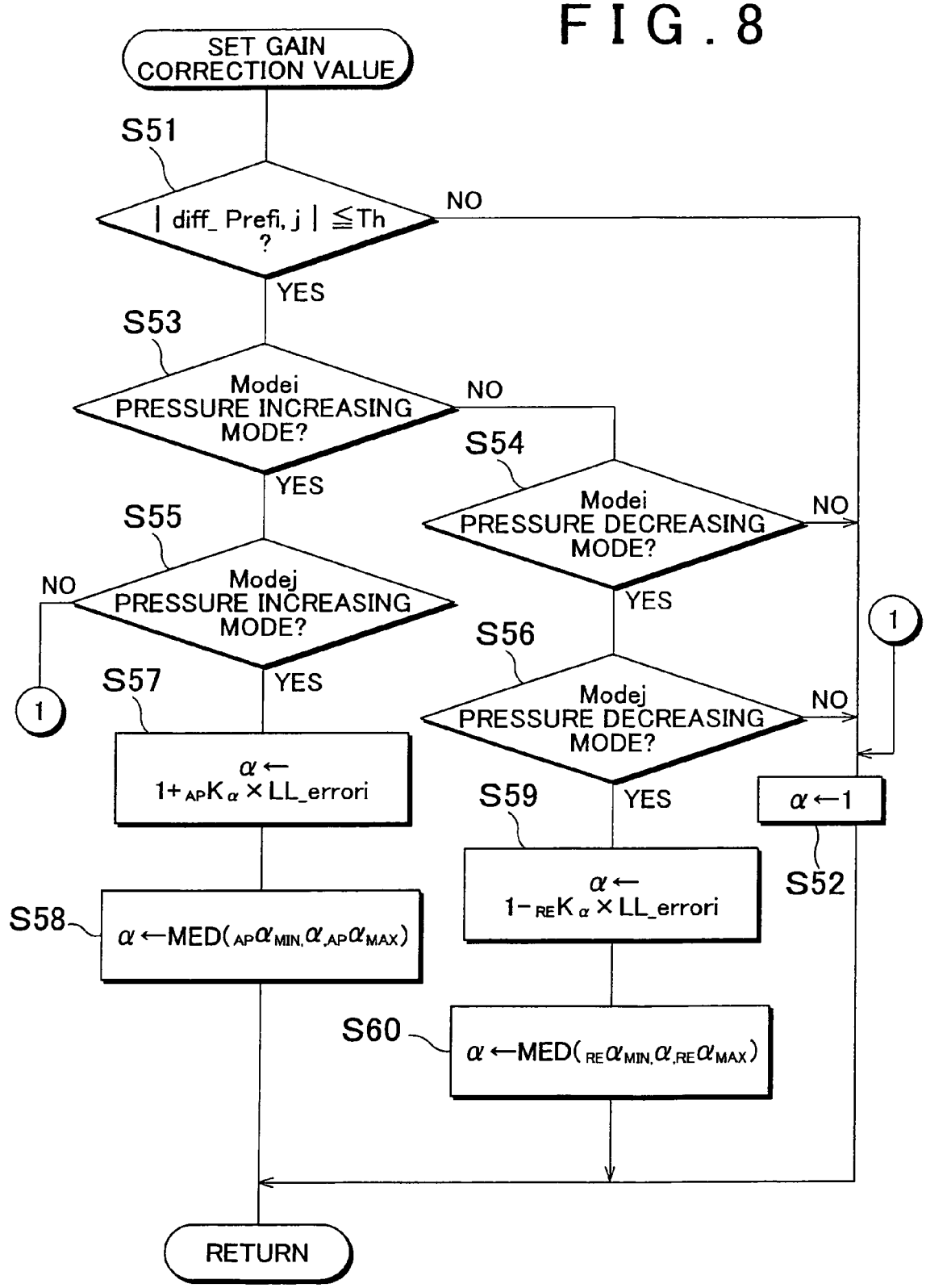
FIG. 8 is a flowchart showing a part of the control command value creating program.

In step S51 in a flowchart in FIG. 8, it is determined whether the absolute value |Prefi−Prefj| of the difference in the target value between the control-target brake system i and the comparison brake system j is equal to or smaller than a threshold value Th. If the absolute value is larger than the threshold value Th, the proportional item gain correction value α is set to "1" in step S52. When the proportional item gain correction value α is "1", correction is not performed, that is, the second control command value is selected (created).

When the absolute value is equal to or smaller than the threshold value Th, the combination of the control mode MODEi in the control-target brake system i and the control mode MODEj in the comparison-target brake system j is obtained in steps S53 to S56. In steps S53 and S54, whether the control mode MODEi in the control-target brake system i is the pressure increasing mode or the pressure decreasing mode is determined. In steps S55 and S56, whether the control mode MODEj in the comparison-target brake system j is the pressure increasing mode or the pressure decreasing mode is determined. When the control mode MODEi in the control-target brake system i is the maintaining mode, or when the control mode MIDEi in the control-target brake system i do not match the control mode MODEj in the comparison-target brake system j, the proportional item gain correction value α is set to "1" in step S52.

Also, when each of both the control mode in the control-target brake system i and the control mode in the comparison-target brake system j is the pressure increasing mode, the proportional gain correction value α is set in steps S57 and S58. When each of both the control mode in the control-target brake system i and the control mode in the comparison-target brake system j is the pressure decreasing mode, the proportional item gain correction value α is set in steps S59 and S60.

In steps S57 and S58, the proportional item gain correction value α is tentatively set according to an equation, α=1+ APKα×LLΔeij. Here, APKα is a constant. Also, LLΔei is the difference (Δei−Δej) between the deviation Δei in the control-target brake system i and the deviation Δej in the comparison-target brake system j. Accordingly, in the case where the difference LLΔei in the deviation is a positive value, as the absolute value thereof increases (as the control delay in the control-target brake system i becomes larger than the control delay in the comparison-target brake system j during the pressure increasing control), the proportional item gain correction value α increases.

Finally, the proportional item gain correction value α is set according to an equation, α=MED (APαMIN, α, APαMAX). APαMIN is the minimum value, and APαMAX is the maximum value, and APαMIN and APαMAX are set in advance. Since the proportional item gain correction value α is limited so as to exceed neither the minimum value APαMIN nor the maximum value APαMAX, the proportional item gain correction value α is prevented from being excessively small or excessively large.

Thus, the proportional gain correction value α when the difference LLΔeij in the deviation between the control-target brake system i and the comparison-target brake system j is large becomes larger than the proportional gain correction value α when the difference LLΔeij is small.

In steps S59 and S60 as well, the proportional gain correction value α is tentatively set according to an equation, α=1− REKα×LLΔei. REKα is a constant. During the pressure decreasing control, the deviation Δei in the control-target brake system i and the deviation Δej in the comparison-target brake system j become negative values. Accordingly, in the case where the difference LLΔei in the deviation is a negative value, as the absolute value of the difference LLΔei increases, the control delay in the control-target brake system i becomes larger than the control delay in the comparison-target brake system j. Therefore, when the difference LLΔei in the deviation is a negative value the proportional gain correction value α is a positive value, and, in general, as the absolute value of the difference LLΔei increases, the proportional gain correction value α increases. The proportional item gain correction value α is set according to an equation, α=MED (REαMIN, α, REαMAX). REαMIN and REαMAX are limit values.

The derivative item gain correction value β and the integral item gain correction value γ are set in the same manner.

The control command value is created by using the control gains KP, KD, and KI that are corrected by the gain correction values α, β, and γ, respectively. The control command value is created according to the control command value creating program shown in a flowchart in FIG. 7.

In the control command value creating program, as in the case of the above-mentioned embodiment, the deviation Δei in the control-target brake system i and the deviation Δej in the comparison-target brake system j are obtained, and the control mode in the control-target brake system i and the control mode in the comparison-target brake system j are obtained. Then, the difference in the target value is obtained.

Then, in step S71, the difference LLΔe in the deviation between the control-target brake system i and the comparison-target brake system j is obtained. In step S72, the gain correction values α, β, and γ are obtained according to the gain correction value setting routine. In step S73, the control gains αKP, βKD, and γKI are set. In step S74, the control command value is created. In a case where each of the gain correction values α, β, and γ is "1", the second control command value (non-consideration control command value) is created. In the other cases, the first control command value (consideration control command value) is created.

As described so far, in the embodiment, when the absolute value of the difference in the target value between the control-target brake system i and the comparison-target brake system j is small, and the combination of the control modes is the predetermined combination, the gain correction values α, β, and γ are set to values corresponding to the difference in response. On the other hand, when the absolute value of the difference in the target value is large, or when the combination of the control modes is not the predetermined combination, each of the gain correction values α, β, and γ is set to "1".

As a result, when the information concerning the comparison-target brake system needs to be taken into consideration, the first control command value is created. On the other hand, when the information concerning the comparison-target brake system need not be taken into consideration, the second control command value is created. Also, at the first control command value, as the difference in the response increases, each of the gain correction values α, β, and γ is set to a value which is deviated from "1" by a larger amount. Accordingly, if the control command value created by using the gain correction value is output, the difference in the response can be reduced.

In the above-mentioned embodiment, the description has been made concerning the case where feedback control is performed, and the control command value is created based on the deviation of the actual value from the target value. However, the invention can be applied to the case where the control including the feed-forward control and the feedback control is performed. When the sum of the control command value set by the feed-forward control and the control command value set by the feedback control is used as the control command value, the invention can be applied to the control command value set by the feedback control.

Also, the invention can be applied to the case where the feed-forward control is performed. The value obtained by correcting the second control command value, which is created based on the target value in the control-target brake system, based on the difference between the actual value in the control-target brake system and the actual value the other brake system is used as the first control command value. When the absolute value of the difference in the target value is small, when the combination of the control modes is not the predetermined combination, and the like, the first control command value is selected.

When each of the control mode in the control-target brake system and the control mode in the comparison-target brake system is the pressure increasing mode, or when each of the control mode in the control-target brake system and the control mode in the comparison-target brake system is the pressure decreasing mode, that is, when the control mode in the control-target brake system matches the control mode in the comparison-target brake system, the first control command value may be selected even if the absolute value of the difference in the target value is large. When these control modes are the same, the directions in which the braking torque changes are also the same. Accordingly, it may be preferable to make the levels of response equal to each other, even when the target values are different from each other.

Also, the invention can be applied to each of the case where the front and rear wheels on the right side are controlled together with each other and the case where the front and rear wheels on the left side are controlled together with each other. In each of these cases, the individual hydraulic control devices 70 and 72 are controlled together with each other, and the individual hydraulic control devices 71 and 73 are controlled together with each other.

In the above-mentioned embodiment, the first control command value or the second control command value is selected based on, as at least one of parameters, the absolute value of the difference between the target value of braking torque in the control-target brake system and the target value of braking torque in the other brake system, in step 5 in FIG. 4 or step 51 in FIG. 8 However, Instead of the parameter, the first control command value or the second control command value may be selected based on, as at least one of parameters, an absolute value of a difference between an absolute value of a deviation of an actual value from the target value of the braking torque in the control-target brake system, and an absolute value of a deviation of an actual value from the target value of the braking torque in the other brake system.

In the above-mentioned embodiment, the description has been made concerning the case where the control command values are created for the brake system 230 for the left front wheel and the brake system 231 for the right front wheel. However, the invention can be applied to the case where the control command values are created for the brake system 232 for the left rear wheel and the brake system 233 for the right rear wheel. In this case, the pressure decreasing linear valves 92 and 93 are normally open valves. The rate of decrease in the hydraulic pressure in each of the brake cylinders 22 and 23 when the control command value that is the supply electric current is large is lower than that when the control command value is small. Accordingly, during the pressure decreasing control, the control command value, which is used when the control delay in the control-target brake system i is larger than the control delay in the comparison-target brake system j, is made smaller than the control command value, which is used when the control delay in the control-target brake system i is smaller than the control delay in the comparison-target brake system j.

In the above-mentioned embodiment, the description has been made concerning the case where the number of the comparison-target brake system is one. However, the number of the comparison-target brake systems may be two or three. When the number of the comparison-target brake systems is two or more, for example, the first control command value may be created by obtaining the correction values for the respective comparison-target brake systems, and employing the average value of the plural correction values. Also, instead of the average value, the intermediate value, the maximum value or the minimum value may be employed. The gain correction value may be obtained in the same manner. In addition, when the information concerning the plural brake systems is taken into consideration, the first control command value may be selected, only when all the control modes in the plural brake systems are the same control mode.

For example, when the brake system 230 for the left front wheel is the control-target brake system, it is determined whether the absolute value of the difference in the target value between the brake system 230 for the left front wheel, and each of the brake system 231 for the right front wheel, the brake system 232 for the left rear wheel, and the brake system 233 for the right rear wheel is equal to or larger than the set value, and it is determined whether the combination of the control mode in the brake system 230, and the control mode in each of the brake system 231 for the right front wheel, the brake system 232 for the left rear wheel, and the brake system 233 for the right rear wheel is the predetermined combination. Based on the results of these determinations, whether the information concerning the comparison-target brake systems is taken into consideration is determined. In this case, during normal braking operation, when the target value of the hydraulic braking torque of the front wheel and the target value of the hydraulic braking torque of the rear wheel are set to the same value, even if the comparison-target brake systems are the brake systems 232 and 233 for the rear wheels, the first control command may be selected due to the relationship. Also, during the normal braking operation, for example, when the target values of the hydraulic braking torque of the respective wheels are set based on loads applied to the respective wheels in addition to the braking torque required by the driver, when the target values of the hydraulic braking torque of the respective wheels are set such that the slip states of the wheels become the same state, and the like, the target value of the hydraulic pressure of the brake cylinder may vary with each brake system for the wheel. In this case, the second control command value is selected in some cases, and the first control is selected in the other cases, depending on the relationship with the comparison-target brake systems. Since the second control command value is selected when the absolute value of the difference in the target value is large, in the control-target brake system 230, the hydraulic pressure of the brake cylinder can be controlled based on the state of the control-target brake system 230, without taking the states of the other brake systems 231, 232 and 233 into consideration.

In the above-mentioned embodiment, the description has been made concerning the case where the invention is applied to the hydraulic brake apparatus. However, the invention can be applied to an electric brake apparatus.

Each of the brake systems may include one brake and one control actuator, may include plural brakes and plural control actuators, or may include plural brakes and one control actuator. In any one of these cases, in one brake system, the one or more control actuators are controlled together with each other, and the one or more brakes are operated together with each other.

The brake may be a hydraulic brake that is operated by the hydraulic pressure of the brake cylinder, or may be the electric brake that is operated by driving force (pressing force) of the electric motor. The control actuator may include the electromagnetic control valve, or may include the electric motor control circuit.

The consideration creating portion my create the control command value in consideration of the information concerning one brake system that is different from the control-target brake system, or may create the control command value in consideration of the information concerning two or more brake systems.

The information concerning the operation of the at least one brake in the brake system is the information indicating the operating state of the brake. For example, the information corresponds to at least one of the information indicating the actual operating state, the information indicating the target operating state, the information concerning the deviation of the actual operating state from the target operating state, and the like. Since the operating state of the brake corresponds to the operating state of the control actuator, the information concerning the operation of the control actuator (the information concerning the control) can be included in the information concerning the operation of the brake.

More specifically, the information corresponds to at least one of the target value of the braking torque of the brake (for example, the target value of the hydraulic pressure of the brake cylinder when the brake is the hydraulic brake, or the target value of the pressing force of the electric motor when the brake is the electric brake), the actual value of the braking torque, the deviation of the actual value from the target value of the braking torque, the control command value for the control actuator, and the like. The information that is taken into consideration when the control command value is created may include at least one of the target value of the braking torque of the brake, the actual value of the braking torque, the deviation of the actual value from the target value of the braking torque, the control command value for the control actuator, and the like.

The braking torque control device may perform feedback control, or may perform feed-forward control. When control including the feedback control and the feed-forward control is performed, the invention can be applied to at least one of the control command value created by the feedback control and the control command value created by the feed-forward control.

While the invention has been described in detail with reference to the preferred embodiments, it will be apparent to those who are skilled in the art that the invention is not limited to the above-mentioned embodiments, and that the invention may be realized in various other embodiments within the scope of the invention.

What is claimed is:

1. A brake system control apparatus comprising:
    plural brake systems, each brake system including at least one brake and a control actuator that can control braking torque generated by the at least one brake, and
    a braking torque control device that creates a control command value for the control actuator of each of the brake systems, and that outputs the created control command value to the control actuator, wherein
    the braking torque control device comprises:
    a consideration command creating portion that creates a first control command value for the control actuator of a control-target brake system, which is one of the plural brake systems, based on information concerning an operation of at least one brake in the control-target brake system, and information concerning an operation of at least one brake in at least one of the other brake systems;
    a non-consideration command creating portion that creates a second control command value for the control actuator of the control-target brake system based on the information concerning the control-target brake system, the second control command being not based on the information concerning the at least one of the other brake systems; and
    a control command value selecting portion that selects one of the first control command value created by the consideration command creating portion and the second control command value created by the non-consideration command creating portion, based on at least one of (a) an absolute value of a difference between a target value of braking torque in the control-target brake system and a target value of braking torque in the at least one of the other brake systems; and (b) a combination of a control mode in the control-target brake system, which is set to one of a pressure increasing mode, a pressure decreasing mode and a pressure maintain mode, and a control mode in the at least one of the other brake systems, which is set to at least one of a pressure increasing mode, a pressure decreasing mode and a pressure maintaining mode,
    the selecting portion selects the first control command value created by the consideration command creating portion when the control mode in the control-target brake system and the control mode in the at least one of the other brake systems are the same, and both the control mode in the control-target brake system and the control mode in the at least one of the other brake systems is the increasing mode in which the braking torque is increased or the decreasing mode in which the braking torque is decreased; and
    the selecting portion selects the second control command value created by the non-consideration command creating portion when one of the control mode in the control-target brake system and the control mode in the at least one of the other brake systems is the increasing mode in which the braking torque is increased, and the other of the control mode in the control-target brake system and the control mode in the at least one of the other brake systems is the decreasing mode in which the braking torque is decreased.

2. The brake system control apparatus according to claim 1, wherein
    the consideration command creating portion creates the first control command value based on the target value and an actual value of the braking torque in the control-target brake system, and the target value and an actual value of the braking torque in the at least one of the other brake systems.

3. The brake system control apparatus according to claim 2, wherein
    the consideration command creating portion creates the first control command value based on a deviation of the actual value from the target value of the braking torque in the control-target brake system, and the deviation of the actual value from the target value of the braking torque in the at least one of the other brake systems.

4. The brake system control apparatus according to claim 1, wherein
    the consideration command creating portion corrects the second control command value created by the non-consideration command creating portion, based on the target value and an actual value in the at least one of the other brake systems and the target value and an actual value in the control-target brake system.

5. The brake system control apparatus according to claim 4, wherein
    the consideration command creating portion creates the first control command value by correcting the second control command value created by the non-consideration command creating portion, based on a deviation of the actual value from the target value of the braking torque in the control-target brake system and a deviation of the actual value from the target value of the braking torque in the at least one of the other brake systems.

6. The brake system control apparatus according to claim 5, wherein
    the consideration command creating portion sets a correction value based on a difference between an absolute value of the deviation of the actual value from the target value of the braking torque in the control-target brake system, and an absolute value of the deviation of the actual value from the target value of the braking torque in the at least one of the other brake systems.

7. The brake system control apparatus according to claim 4, wherein
    the consideration command creating portion creates the first control command value for the control-target brake system based on the information concerning the control-target brake system and information concerning a brake system whose level of response is required to be the same as a level of response of the control-target brake system.

8. The brake system control apparatus according to claim 1, wherein
the consideration command creating portion creates the first control command value based on the information concerning the control-target brake system and information concerning a brake system including the brake that suppresses rotation of a wheel which is on an opposite side, in a right-and-left direction, of a wheel whose rotation is suppressed by the control-target brake system.

9. The brake system control apparatus according to claim 1, wherein
each brake system includes a brake that is a hydraulic brake that applies hydraulic braking torque to a brake rotational body that can rotate together with a wheel by pressing a friction member to the brake rotational body due to hydraulic pressure of a brake cylinder, thereby suppressing rotation of the wheel;
the control actuator includes at least one electromagnetic control valve that can control the hydraulic pressure of at least one brake cylinder; and
the braking torque control device controls the hydraulic pressure of the at least one brake cylinder by creating the control command value corresponding to an electric current supplied to the electromagnetic control valve, and outputting the control command value to the electromagnetic control valve.

10. The brake system control apparatus according to claim 9, wherein
the electromagnetic control valve permits hydraulic fluid to flow through the electromagnetic control valve at an opening amount that is decided based on at least the electric current supplied to the electromagnetic control valve; and
the consideration command creating portion creates the first control command value indicating the electric current supplied to the electromagnetic control valve such that a difference in response between the control-target brake system and the at least one of the other brake systems is reduced.

11. The brake system control apparatus according to claim 10, wherein
the electromagnetic control valve includes a seating valve including a valve element, a valve seat, and a spring; and a solenoid.

* * * * *